US008271891B1

(12) United States Patent
Osbourn et al.

(10) Patent No.: US 8,271,891 B1
(45) Date of Patent: Sep. 18, 2012

(54) COMPUTING ENVIRONMENT LOGBOOK

(75) Inventors: Gordon C. Osbourn, Albuquerque, NM (US); Ann M. Bouchard, Alburquerque, NM (US)

(73) Assignee: Sandia Corporation, Albuquerque, NM (US)

(*) Notice: Subject to any disclaimer, the term of this patent is extended or adjusted under 35 U.S.C. 154(b) by 1295 days.

(21) Appl. No.: 11/670,709

(22) Filed: Feb. 2, 2007

(51) Int. Cl.
*G06F 3/048* (2006.01)

(52) U.S. Cl. ............ 715/764; 715/704; 715/776; 714/1; 714/2; 714/15; 714/19; 345/901; 707/674; 707/678; 707/683; 707/684

(58) Field of Classification Search .................. 715/764, 715/704, 776; 714/19, 1, 2, 15; 345/901; 707/674, 678, 683, 684
See application file for complete search history.

(56) References Cited

U.S. PATENT DOCUMENTS

| | | | | |
|---|---|---|---|---|
| 5,872,909 | A * | 2/1999 | Wilner et al. ................ 714/38 |
| 6,185,577 | B1 * | 2/2001 | Nainani et al. .................... 1/1 |
| 6,185,591 | B1 * | 2/2001 | Baker et al. .................. 715/210 |
| 6,185,600 | B1 * | 2/2001 | Spence et al. ................ 709/203 |
| 6,415,316 | B1 * | 7/2002 | Van Der Meer ............. 709/203 |
| 6,957,415 | B1 | 10/2005 | Bouchard et al. |
| 7,158,985 | B1 * | 1/2007 | Liskov ................................ 1/1 |
| 7,231,267 | B2 * | 6/2007 | Bournas et al. ................. 700/91 |
| 7,251,584 | B1 * | 7/2007 | Perazolo et al. .............. 702/183 |
| 7,290,002 | B2 * | 10/2007 | Shapiro et al. ..................... 1/1 |
| 7,469,279 | B1 * | 12/2008 | Stamler et al. ................ 709/221 |
| 7,565,425 | B2 * | 7/2009 | Van Vleet et al. ............. 709/224 |
| 7,620,715 | B2 * | 11/2009 | DiFalco et al. ................ 709/224 |
| 7,743,332 | B2 * | 6/2010 | Clark et al. ................... 715/736 |
| 7,774,790 | B1 * | 8/2010 | Jirman et al. ................. 719/318 |
| 2002/0049926 | A1 * | 4/2002 | Korenshtein ................... 714/16 |
| 2002/0107886 | A1 * | 8/2002 | Gentner et al. ................ 707/511 |
| 2003/0079032 | A1 * | 4/2003 | Orsolits et al. ................ 709/230 |
| 2004/0030954 | A1 * | 2/2004 | Loaiza et al. .................... 714/20 |
| 2004/0039750 | A1 * | 2/2004 | Anderson et al. ......... 707/103 R |
| 2004/0167912 | A1 * | 8/2004 | Tsui et al. ...................... 707/100 |
| 2004/0172577 | A1 * | 9/2004 | Tan et al. ......................... 714/13 |
| 2004/0205663 | A1 * | 10/2004 | Mohamed ..................... 715/530 |
| 2004/0260974 | A1 * | 12/2004 | Livshits .......................... 714/19 |
| 2005/0034057 | A1 * | 2/2005 | Hull et al. ................... 715/500.1 |
| 2005/0256956 | A1 * | 11/2005 | Littlefield et al. ............ 709/225 |
| 2005/0289187 | A1 * | 12/2005 | Wong et al. ................... 707/200 |
| 2006/0002536 | A1 * | 1/2006 | Ambrose ................. 379/142.01 |
| 2006/0085412 | A1 * | 4/2006 | Johnson et al. .................... 707/4 |
| 2006/0129914 | A1 * | 6/2006 | Ellis et al. ..................... 715/504 |
| 2006/0161816 | A1 * | 7/2006 | Gula et al. ....................... 714/39 |
| 2006/0211404 | A1 * | 9/2006 | Cromp et al. ................. 455/405 |
| 2007/0005616 | A1 * | 1/2007 | Hay et al. ...................... 707/100 |
| 2007/0083530 | A1 * | 4/2007 | Lakshminath et al. ....... 707/100 |
| 2007/0088668 | A1 * | 4/2007 | Larab et al. ....................... 707/1 |
| 2007/0118310 | A1 * | 5/2007 | Kindseth et al. ............... 702/64 |
| 2007/0271527 | A1 * | 11/2007 | Paas et al. ..................... 715/810 |
| 2008/0028009 | A1 * | 1/2008 | Ngo .............................. 707/204 |
| 2008/0109831 | A1 * | 5/2008 | Lee ............................... 719/329 |
| 2008/0126972 | A1 * | 5/2008 | Ballard et al. ................ 715/772 |
| 2008/0172607 | A1 * | 7/2008 | Baer ............................. 715/255 |

OTHER PUBLICATIONS

Meng et al., Visualizing Histories for Selective Undo and Redo, Jul. 1998, IEEE, Computer Human Interaction, 1998. Proceedings. 3rd Asia Pacific, pp. 459-464.*

(Continued)

*Primary Examiner* — Patrick Riegler
(74) *Attorney, Agent, or Firm* — Cory G. Claassen; Aaron J. Visbeek; Blakely Sokoloff Taylor & Zafman LLP

(57) ABSTRACT

A computing environment logbook logs events occurring within a computing environment. The events are displayed as a history of past events within the logbook of the computing environment. The logbook provides search functionality to search through the history of past events to find one or more selected past events, and further, enables an undo of the one or more selected past events.

37 Claims, 15 Drawing Sheets

OTHER PUBLICATIONS

Osbourn, Gordon C. et al., "Dynamic Self-Assembly of Hierarchical Software Structures/Systems", Sandia National Laboratories, Mar. 2003.
Bouchard, Ann M. et al., "Dynamic Self-Assembly and Computation: From Biological to Information Systems", Sandia National Laboratories, Physical and Chemical Sciences Center, Jan. 2004.
U.S. Appl. No. 10/456,115.
U.S. Appl. No. 11/527,002.
U.S. Appl. No. 11/527,100.
http://wiki.laptop.org/go/OLPC_Human_Interface_Guidelines/The_Laptop_Experience/The_Journal.

* cited by examiner

COMPUTING ENVIRONMENT LOGBOOK

This invention was made with Government support under Contract No. DE-AC04-94AL85000 between Sandia Corporation and the U.S. Department of Energy. The U.S. Government has certain rights in this invention.

TECHNICAL FIELD

This disclosure relates generally to software, and in particular but not exclusively, relates to a logbook for logging, displaying, searching, or manipulating a history of events occurring within a computing environment.

BACKGROUND INFORMATION

Computer systems have affected many aspects of society including the way we live and work. Computer systems now commonly perform a host of tasks, such as shopping, accounting, and word processing, that prior to the advent of the computer system were typically performed manually. Due to the physical nature of accessing information prior to the advent of computers, the volume of information that could be accessed was limited and it was difficult to inadvertently delete or modify a document. Today, computers have streamlined mundane tasks, such as creating, deleting, modifying, or simply viewing a document, to the point that a computer user can accomplish these tasks with little more than a mouse click or a key stroke. Over the course of a typical day a user may access many different files for a variety of purposes. Over the period of a week or month the sheer number of documents accessed by a typical office worker can be staggering. Due to the impermanent and editable nature of electronic data, seemingly innocuous operator errors can result in profound and deleterious mistakes causing irreparable loss or corruption of important user data.

Microsoft Windows™ based products have attempted to address these issues in a piecemeal manner with limited success. For example, the Internet Explorer™ web browser includes a "history" function that allows a user to view a list of addresses of webpages visited by the user. Microsoft Word™ and Microsoft Excel™ include an undo function which enables the user to undo document edits in a rigid step-by-step reverse chronological order. Microsoft Outlook™ maintains time stamped lists of emails sent and received, which can be word searched to aid the user in finding a particular email.

Each of the aforementioned usability functions are application centric. The undo feature in Word or Excel is only applicable to the particular document currently open and all undo history is lost upon closing the document. Similarly, the history function within Internet Explorer provides little more than a simple read-only history of web addresses previously visited and has no relevance in Word, Excel, or Outlook.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for logging, displaying, searching, or manipulating a history of events occurring within a computing environment are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
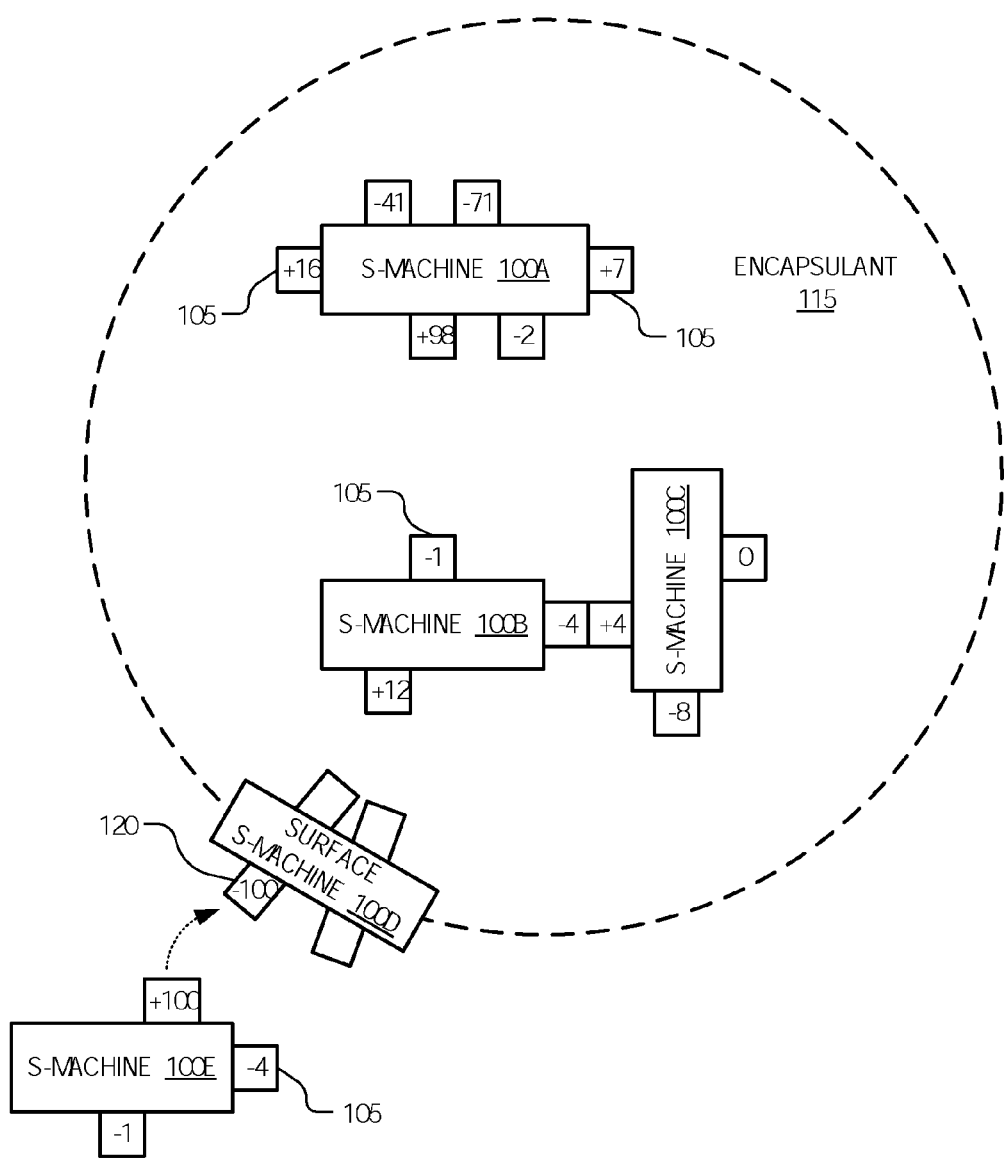
FIG. 1 is a block diagram illustrating self-assembling s-machines grouped in an encapsulated environment, in accordance with an embodiment of the invention.

FIG. 1 is a block diagram illustrating a software virtual environment including software entities termed "software-machines" or "s-machines" 100A-100E (collectively s-machines 100), in accordance with an embodiment of the invention. Each s-machine 100 is capable of executing a function, which can be simple (such as adding two numbers) or complex (such as reading a complex formatted file from the hard disk). Each s-machine 100 includes one or more of a data storage element to store data, an actuating element to execute commands, or a control element to control activation of the s-machine in response to a stimulus.

S-machines 100 are capable of self-assembling or self-organizing by binding or linking to each other to form a larger s-machine complex capable of executing higher level complex tasks. For example, multiple s-machines 100 may be created, one capable of summing two operands, one capable of subtracting one operand from another, one capable of multiplying two operands, and yet another capable of dividing one operand into another operand. The s-machines capable of implementing these simple mathematical functions may then bind together with one or more other s-machines capable of generating a graphical user interface ("GUI"). By self-organizing into a more complex structure, these simple s-machines can create a graphical calculator. Since self-organizing is executed during runtime, additional s-machines capable of other mathematical functions can be created and joined with the existing s-machines of the calculator group to extend the functionality of the calculator during runtime, after compile time. In this manner, s-machines 100 are capable of generating a real-time, user-adaptable, computing environment.

S-machines 100 self-assemble using binding sites 105 (only a portion are labeled so as not to clutter the drawing). Each s-machine 100 may include one or more binding sites 105 that can remain concealed pending the occurrence of prerequisite conditions, at which time the concealed binding site exposes itself to other s-machines 100. In some cases, the act of binding itself is the prerequisite or stimulus for exposing another concealed binding site. Each binding site 105 is associated with a key and can stochastically or deterministically bind to another exposed binding site on a different s-machine 100 having a complementary key or other key pair association framework. S-machines 100 make and break bonds formed between complementary binding sites 105 in due course during runtime. In one embodiment, when binding sites of two s-machines 100 are linked, the two sites have pointers pointing to each other. This provides a data pathway between the two s-machines, enabling the s-machines to access each other's data, pass data to each other, or send commands to each other. These bonds may be short-lived or long-lived. The act of binding/unbinding (also referred to linking/unlinking or coupling/decoupling) may be the stimulus to cause one or more internal actuation elements of an s-machine 100 to execute. A signal (whether data-passing or not) sent from one s-machine to a bound s-machine may also be the stimulus to cause internal actuation elements of one or both s-machines 100 to execute. In other cases, other stimulus may cause an s-machine 100 to execute its actuation element(s).

S-machines 100 can self-organize into hierarchical data structures having limited scope. For example, surface s-machine 100D may function as an interface to encapsulant 115 to limit the scope of s-machines 100A-100C contained within encapsulant 115. Encapsulant 115 acts as a sort of virtual environment of limited scope where s-machines 100 within this virtual environment form some application, function, or process.

Surface s-machine 100D can operate as a sort of gate keeper allowing s-machines to enter or exit encapsulant 115. In this role, surface s-machine 100D has a key associated with a binding site 120 and any s-machine 100 wishing to pass through the virtual encapsulant surface must have a complementary key. Alternatively, surface s-machine 100D can operate as a signal transducer across the encapsulant surface. In that role, when an external s-machine having a complementary key binds to binding site 120, this stimulates surface s-machine 100D to expose a site internal to the encapsulant, which can trigger the execution of some internal task by binding to a control site of an internal s-machine. Encapsulant 115 effectively creates a local environment in which collections of free binding sites 105 can interact without interference from the outside world. S-machines 100 encapsulated within encapsulant 115 can reuse binding keys already in use by other s-machines outside of encapsulant 115 without establishing bonds thereto. It should be appreciated that encapsulant 115 is not necessarily intended to connote a literal barrier formed around the internal s-machines 100A, 100B, 100C, but rather a functional barrier that computationally isolates the internal s-machines 100A, 100B, and 100C in some manner from external s-machine 100E.

In one embodiment, the virtual environment created by s-machines 100 and encapsulant 115 is a biologically inspired software architecture. S-machines 100 are analogous to proteins, which operate as molecular machines. S-machines 100 self-assemble via binding/unbinding events in a dynamic manner similar to continually reconfiguring proteins. As mentioned, the bonds between s-machines 100 can be long lived, analogous to strong covalent bonds, or fleeting, analogous to weak protein-protein bonds. Encapsulant 115 resembles a biological cell membrane that isolates its internal contents from bonding interactions with external structures. Surface s-machine 100D, itself, is analogous to membrane proteins in biological cells. Some surface s-machines, termed "gates", correspond to channel proteins, allowing passage of other entities (s-machines or encapsulants) into or out of the encapsulant. Other surface s-machines may correspond to signal or receptor proteins capable of communicating signals without transporting any s-machines into or out of an encapsulant.

Figure 2:
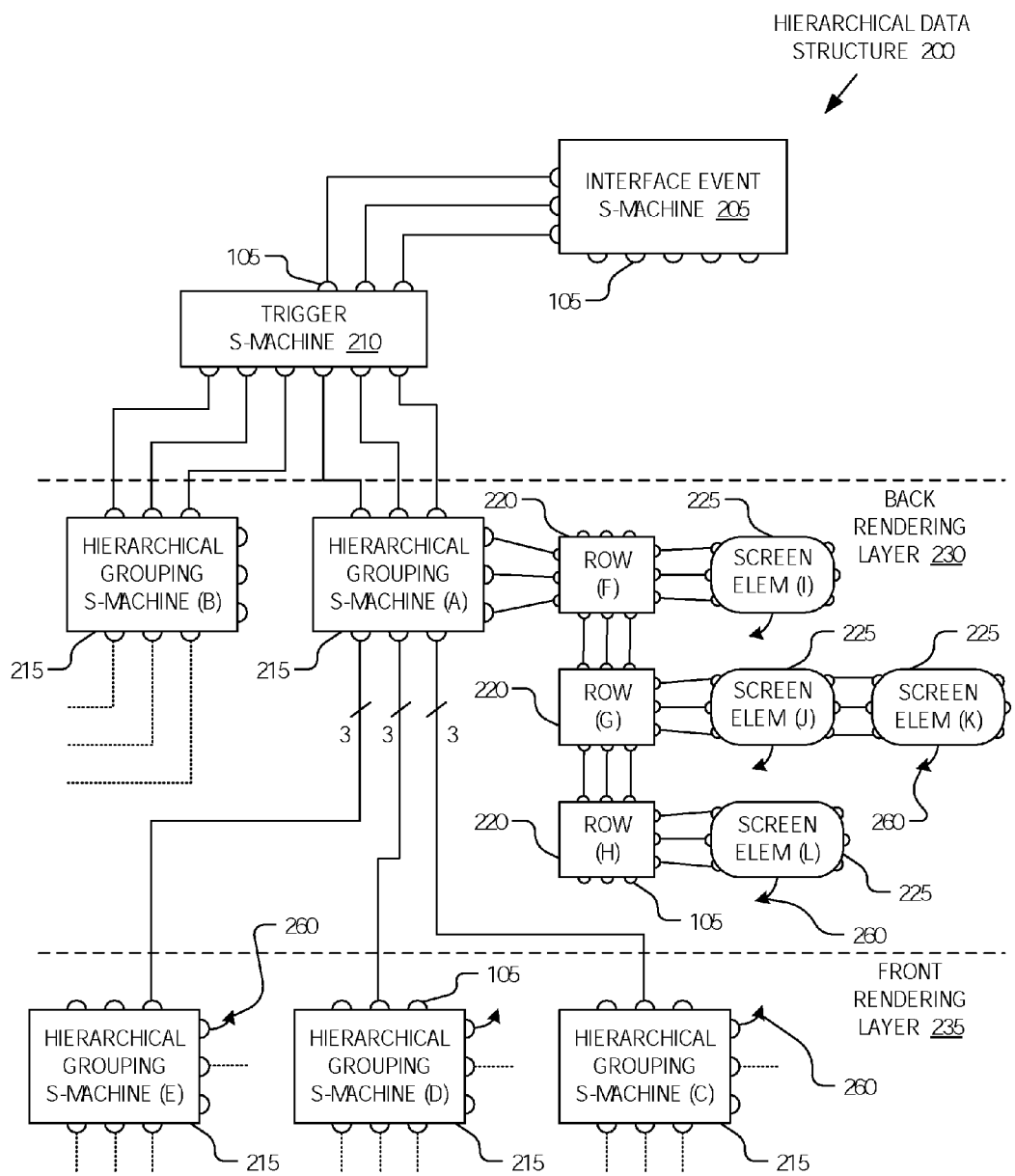
FIG. 2 is a block diagram illustrating a hierarchical data structure for controlling and rendering images to a display screen, in accordance with an embodiment of the invention.

FIG. 2 is a block diagram illustrating a hierarchical data structure 200 including s-machines for rendering and interacting with screen elements, in accordance with an embodiment of the invention. The illustrated embodiment of hierarchical data structure 200 includes an interface event s-machine 205, a trigger s-machine 210, hierarchical grouping s-machines 215, row rendering s-machines 220, and screen element s-machines 225. The s-machines dynamically self-organize into hierarchical data structure 200 by matching complementary binding keys associated with their binding sites 105 (only a portion are labeled), as discussed above.

Figure 3:
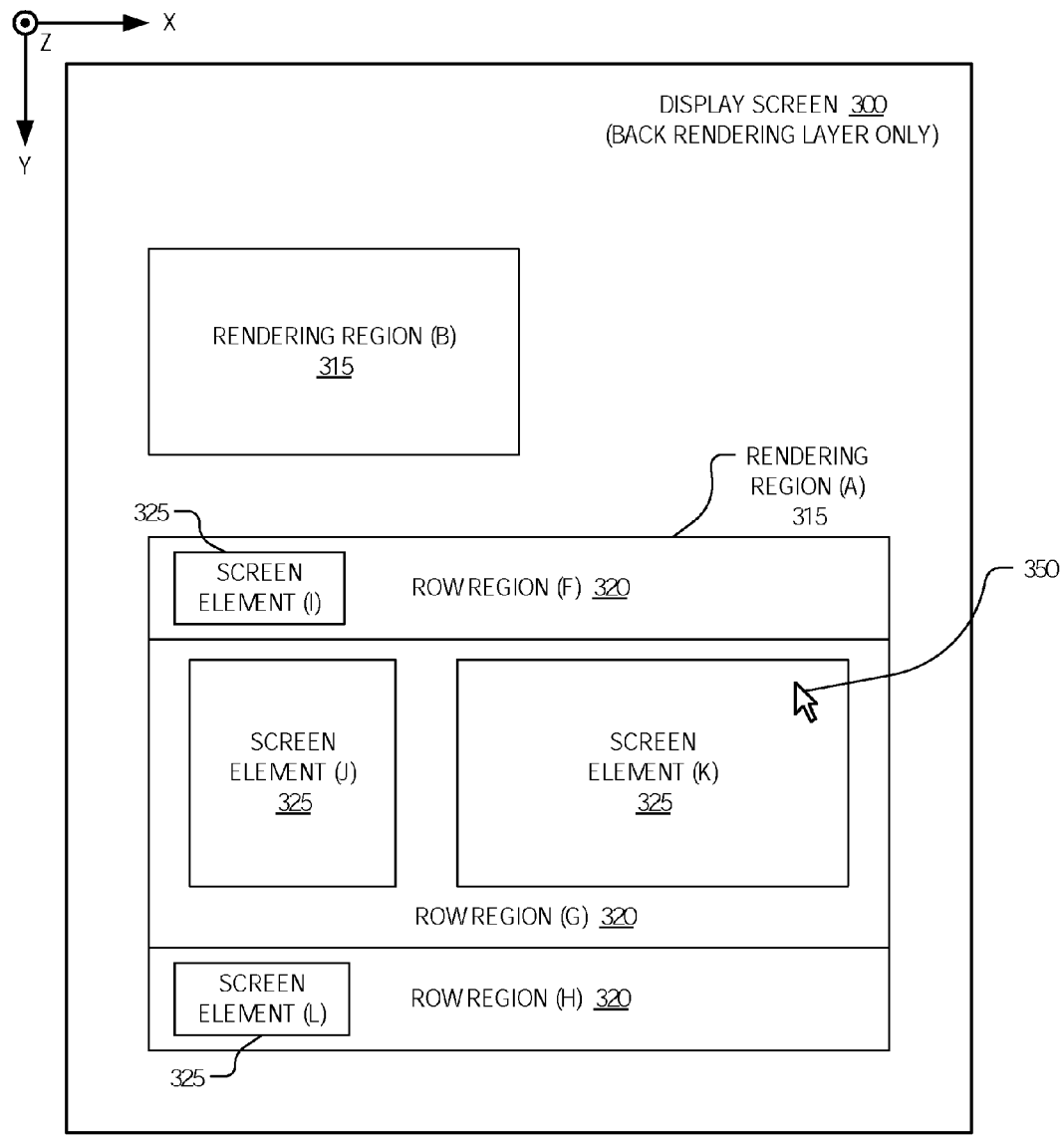
FIG. 3 is a block diagram illustrating a display screen with multiple rendering regions, row regions, and screen elements, in accordance with an embodiment of the invention.

FIG. 3 illustrates an example display screen 300 including screen elements rendered by hierarchical data structure 200. FIG. 3 only illustrates a single rendering layer, corresponding to a back rendering layer, while multiple front rendering layers (not illustrated) may be rendered directly in front of, and therefore partially conceal, the back rendering layer.

Each hierarchical grouping s-machine 215 is associated with a corresponding rendering region 315 (e.g., hierarchical grouping s-machine (A)->rendering region (A), hierarchical grouping s-machine (B)->rendering region (B), etc.). Each row rendering s-machine 220 is associated with a corresponding row region 320 (e.g., row rendering s-machine (F)->row region (F), row rendering s-machine (G)->row region (G), etc.). Similarly, each screen element s-machine 225 is associated with a corresponding screen element 325 (e.g., screen element s-machine (J)->screen element (J), screen element s-machine (L)->screen element (L), etc.).

Hierarchical grouping s-machines 215, row rendering s-machines 220, and screen element s-machines 225 are organized into a hierarchy where vertically bound hierarchical grouping s-machines 215 connote successive rendering layers. Since hierarchical grouping s-machines (A) and (B) are both bound within hierarchical data structure 200 at the same rendering layer (i.e., back rendering layer 230), they group row rendering s-machines 220 and screen element s-machines 225 responsible for rendering screen elements 325 on the same rendering layer. In contrast, hierarchical grouping s-machines (C), (D), and (E) are bound below hierarchical grouping s-machine (A), and therefore group row rendering s-machines and screen element s-machines responsible for rendering screen elements at a front rendering layer 235 that is in front of or overlays back rendering layer 230 (i.e., front rendering layer 235 has a greater value in the z-axis than back rendering layer 230, see FIG. 3). Furthermore, since hierarchical grouping s-machines (C), (D), and (E) are all bound below hierarchical grouping s-machine (A), these s-machines will correspond to rendering regions that have the same or smaller x-y dimensions as rendering region (A) of hierarchical grouping s-machine (A), but will be bounded by the x-y coordinates of rendering region (A), and therefore reside in front of at least a portion of rendering region (A).

In one embodiment, screen element s-machines 225 include data or pointers to data for generating each screen element 325 rendered to display screen 300. For example, screen element s-machines 225 may provide the data used to render an image, text, blank region, or any other object to display screen 300.

One or more screen element s-machines 225 may link in series from a single row rendering s-machine 220. In one embodiment, row rendering s-machines 220 include functionality for rendering each screen element 325 included within its associated row region 320 to display screen 300 with reference to data provided by the corresponding screen element s-machine 225. It should be appreciated that in other embodiments, the functionality for rendering screen elements 325 may be embedded within screen element s-machines 225 themselves or hierarchical grouping s-machines 215.

In one embodiment, interface event s-machine 205 includes functionality for tracking the movement of a screen pointer 350 (see FIG. 3) and may include knowledge of the x-y coordinates of screen pointer 350, the relative motion of screen pointer 350 from one spot on display screen 300 to another, the velocity of screen pointer 350, or otherwise. Interface event s-machine 205 may further poll external input/output ("I/O") devices (e.g., key board, mouse, etc.) for events associated with the current location of screen pointer 350 (e.g., key strokes, scroll wheel movement, mouse clicks, etc.).

Trigger s-machine 210 is bound between interface event s-machine 205 and hierarchical grouping s-machines at the back rendering layer (e.g., hierarchical grouping s-machines (A) and (B) at back rendering layer 230). In one embodiment, trigger s-machine 210 receives the current x-y coordinates of screen pointer 350 and sends a signal with the x-y coordinates to the hierarchical grouping s-machines (A) and (B). Hierarchical grouping s-machines (A) and (B) determine whether screen pointer 350 currently resides over any portion of their corresponding rendering region 315. If it does, hierarchical grouping s-machines 215 will pass this signal on to successive hierarchical grouping s-machines bound below. In FIG. 2, if hierarchical grouping s-machine (A) determined that the screen pointer 350 resides over its rendering region, it would pass the x-y coordinate signal to hierarchical grouping s-machines (C), (D), and (E). The lowest hierarchical grouping s-machine in the hierarchy (corresponding to the front-most rendering layer) that determines that the screen pointer 350 resides over its rendering region will also forward the x-y coordinate signal on to its attached row rendering s-machines 220 and screen element s-machines 225 to determine over which screen element 325 screen pointer 350 currently resides. When a particular screen element s-machine 225 determines that screen pointer 350 currently resides over its corresponding screen element 325, the particular screen element s-machine 225 becomes the "owner" of the screen pointer 350. The screen element s-machine 225 that owns the screen pointer 350 will expose new binding sites 105 to establish new event pathways (discussed in greater detail below in connection with FIGS. 4 and 5). It should be appreciated that in other embodiments, the functionality for determining which screen element s-machine 225 owns the screen pointer 350 may be embedded within the row rendering s-machines 220 or the hierarchical grouping s-machines 215.

Trigger s-machine 210 may further be capable of issuing render signals to the lower hierarchy of hierarchical data structure 200 to signal each s-machine to re-execute its rendering instructions (e.g., OpenGL commands, DirectX commands, or the like). Trigger s-machine 210 may further be capable of signaling the lower hierarchy that display screen 300 has changed (e.g., user dragged a screen element to a new screen location) and that each s-machine should update itself and render accordingly. Although FIG. 2 illustrates three bonds between each s-machine within hierarchical data structure 200 (one for each of the rendering, screen pointer x-y coordinate, and update signals) it should be appreciated that more or less such bonds may be established between the s-machines.

The illustrated embodiment of hierarchical data structure 200 further illustrates bonds 260 for establishing communication pathways between screen element s-machines 225 and hierarchical grouping s-machines 215. For example, a particular screen element s-machine 225 may establish a bond 260 with one or more hierarchical grouping s-machines 215 that correspond to rendering regions 315 that reside directly in front of, at the next rendering layer forward, the corresponding screen element 325 of the particular screen element s-machine 225. Bonds 260 enable the back rendering layer screen element s-machines 225 to signal the bound-to hierarchical grouping s-machines 215 (which render the next rendering layer forward) to detach from hierarchical data structure 200. Upper rendering layer hierarchical grouping s-machines 215 may detach from hierarchical data structure 200 so that other hierarchical grouping s-machines 215 can attach to change the image rendered to display screen 300. The attachment and detachment of hierarchical grouping s-machines 215 is discussed in further detail below in connection with FIGS. 10, 11, and 12.

Figure 4:
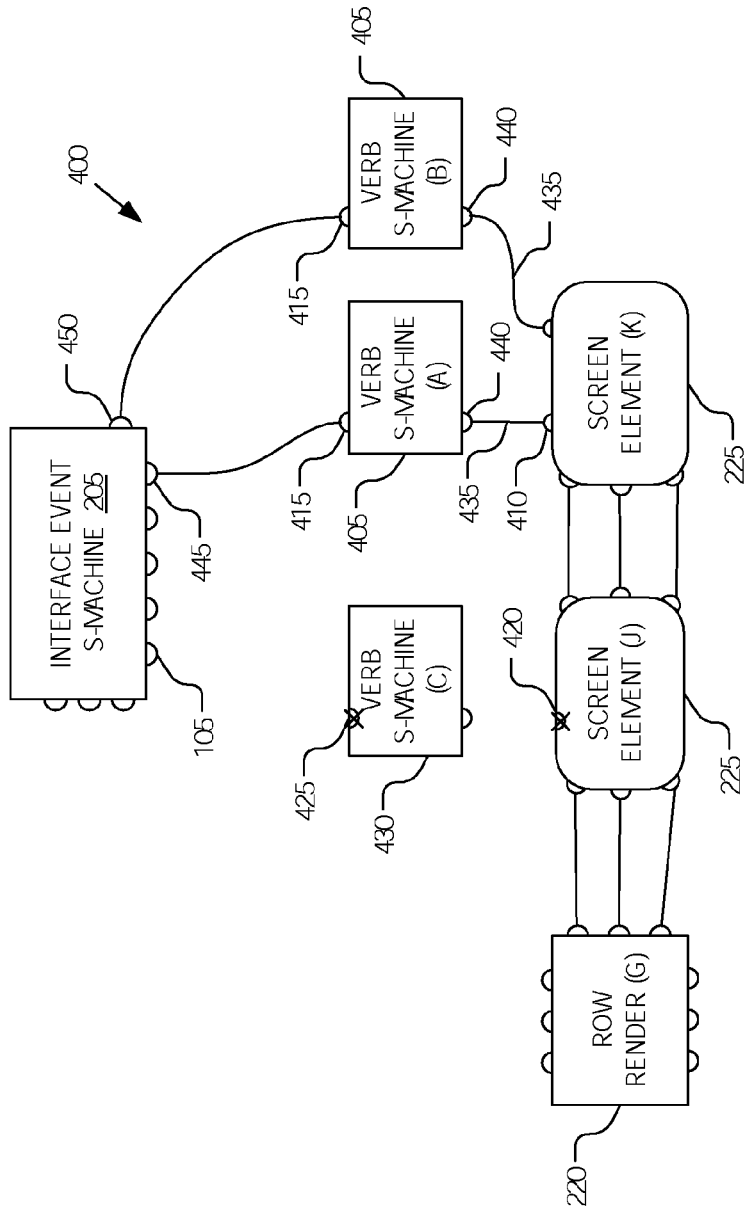
FIG. 4 is a block diagram illustrating self-assembly of an event pathway between an interface event s-machine, a verb s-machine, and a screen element s-machine, in accordance with an embodiment of the invention.

FIG. 4 is a block diagram illustrating self-assembly of an event pathway 400, in accordance with an embodiment of the invention. Event pathway 400 links interface event s-machine 205 to screen element (K) via a verb s-machine 405. Event pathway 400 is created in real-time in response to a specific event or set of events. Verb s-machine 405 is a special type of s-machine 100 that binds to other s-machines 100 to implement functions and take "actions" associated with the bound-to s-machine 100. In the present example, verb s-machines bind to screen element s-machines 225 to execute actions associated with their corresponding screen elements 325.

For example, event pathway 400 may be created in response to passing screen pointer 350 over screen element (K). For the sake of discussion, if screen element (K) is a text area rendered to display screen 300, then positioning screen pointer 350 over screen element (K) and left "clicking" a mouse button may insert a cursor within the text, putting the text area into edit mode. Additionally, positioning screen pointer 350 over screen element (K) and then pressing the left mouse button down and dragging may select and highlight text. The functionality of initiating text editing and selecting text may be implemented by verb s-machines 405, as described below.

Figure 5:
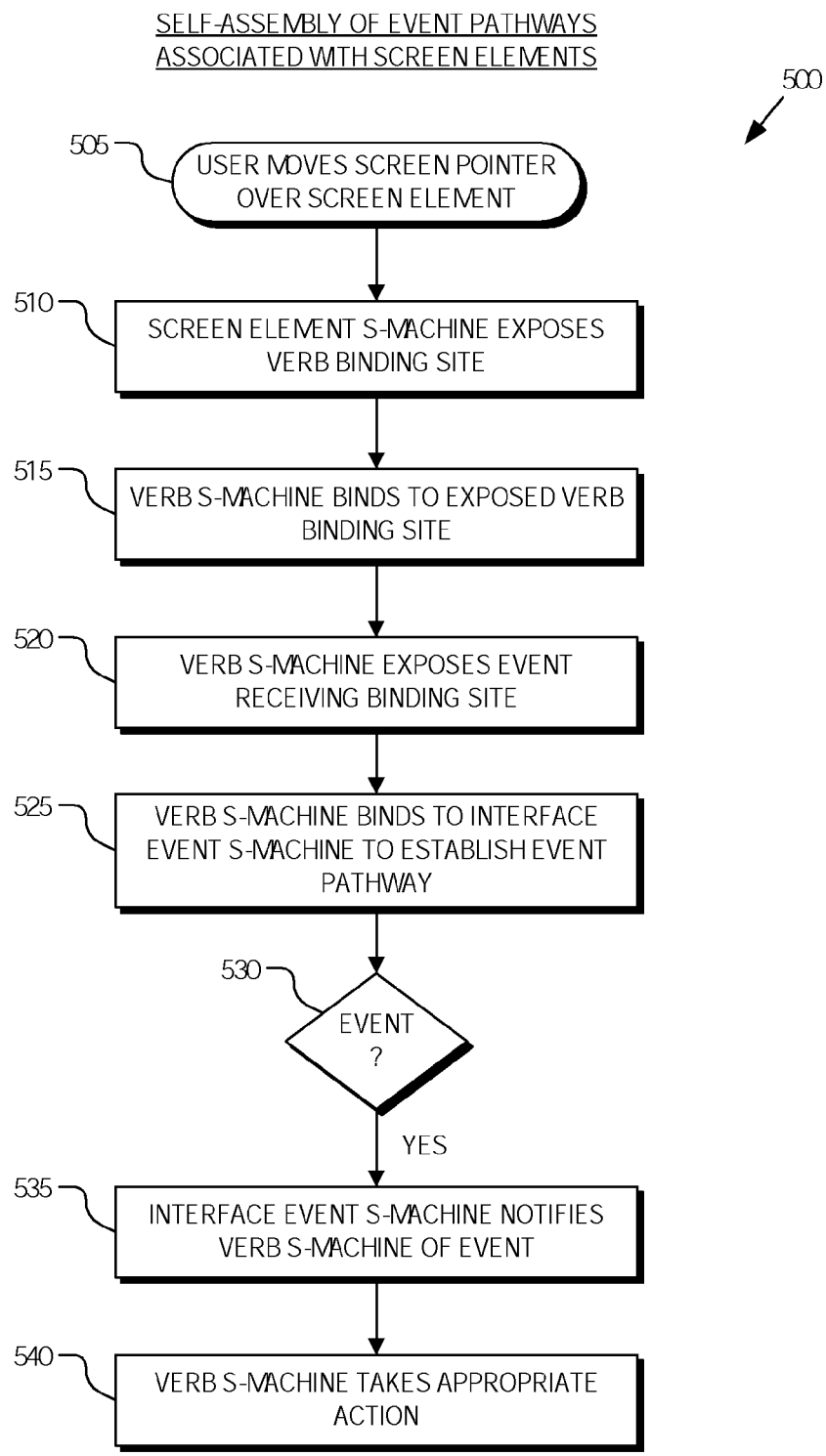
FIG. 5 is a flow chart illustrating a process to self-assemble event pathways associated with screen elements to implement various functionality associated with the screen elements, in accordance with an embodiment of the invention.

FIG. 5 is a flow chart illustrating a process 500 to self-assemble event pathway 400 associated with screen element (K) to implement various functionalities associated with screen element (K), in accordance with an embodiment of the invention. The order in which some or all of the process blocks appear below should not be deemed limiting. Rather, one of ordinary skill in the art having the benefit of the present disclosure will understand that some of the process blocks may be executed in a variety of orders not illustrated.

In a process block 505, a user moves screen pointer 350 over screen element (K). In a process block 510, screen element s-machine (K) exposes one or more verb binding sites 410 in response to screen pointer 350. In one embodiment, screen element s-machine (K) exposes verb binding site 410 in response to a signal issued by trigger s-machine 210, and propagated by hierarchical grouping s-machines 215, as to which screen element s-machine 225 owns screen pointer 350. Since in the illustrated embodiment of FIG. 3, screen pointer 350 is residing over screen element (K), screen element s-machine (K) responds by exposing one or more verb binding sites 410. Since the text area represented by screen element s-machine (K) can respond to left-mouse-click events (initiating text editing) and left-mouse-down-and-drag events (selecting text), screen element s-machine (K) will expose two verb binding sites 410, with binding site keys complementary to the binding site keys 440 of two different verb s-machines (A) and (B). Verb s-machine (A) embeds the functionality of responding to left-mouse-click events by initiating text editing. Verb s-machine (B) embeds the functionality of responding to left-mouse-down-and-drag events by selecting text.

In a process block 515, verb s-machines 405 (A) and (B) bind to exposed verb binding sites 410 to create temporary bonds 435 that last as long as the user maintains screen pointer 350 over screen element (K). In a process block 520, verb s-machines 405 that are bound to screen element s-machine (K) expose an event receiving binding site 415. Event receiving binding site 415 is exposed in response to verb s-machine 405 binding to screen element s-machine (K). The key of binding site 415 of verb s-machine (A) is complementary to that of the binding site 445 of interface event s-machine 205 associated with left-mouse-click events. The key of binding site 415 of verb s-machine (B) is complementary to that of the binding site 450 of interface event s-machine 205 associated with left-mouse-down-and-drag events. Upon exposing event receiving binding site 415, verb s-machines (A) and (B) 405 bind to interface event s-machine 205 (process block 525). At this point, one or more event pathways 400 are established and ready to service events associated with screen element (K). In this example, two event pathways 400 are established, one associated with left-mouse-click events and one associated with left-mouse-down-and-drag events.

Interface event s-machine 205 may be constantly polling for a variety of different types of events, such as a left mouse click, left-mouse-down-and-drag, a key stroke, a scroll wheel action, a cursor navigation action, or otherwise. Interface event s-machine 205 may have a binding site 105 associated with each such event type, each with a different key. In a decision block 530, if an event of a type associated with a bound binding site 105 of interface event s-machine 205 occurs, then the event is valid, and the process 500 continues to a process block 535. If an event occurs for which interface event s-machine 205 has no bound event pathway, the event is invalid and no action is taken. Events can be categorized into event types based on a variety of factors including location of a cursor on a display screen, the current state of a computing environment (e.g., is a book open, what application is currently being accessed, etc.), and whether the user input is a mouse click, a key stroke, a scroll wheel action, a cursor navigation, or otherwise.

Upon the occurrence of a valid event (decision block 530), interface event s-machine 205 sends a signal through the binding site 105 associated with the event type. This signals the appropriate verb s-machine 405 of the event occurrence along event pathway 400 (process block 535). Finally, in a process block 540, the signaled verb s-machine 405 takes the appropriate action in response to the specific event. For example, if the interface event was a left mouse click, verb s-machine (A) 405 would be signaled, and respond by rendering a cursor in the x-y location of the screen pointer and putting the text in editing mode. It should be appreciated that embodiments of verb s-machines 405 are not limited to binding to screen element s-machines 225 for initiating text editing or selecting text, but rather may bind to a row rendering s-machines 220 or hierarchical grouping s-machines 215 to implement a variety of actions in response to a variety of events.

Returning to FIGS. 3 and 4, screen pointer 350 is not currently residing over a screen element (J) 325. Therefore, verb binding site 420 of screen element s-machine (J) 225 is internally hidden. Correspondingly, event receiving binding site 425 of verb s-machine 430 is also hidden, since verb s-machine 430 is not currently bound to any screen element s-machine. For the sake of discussion, suppose screen element (J) 325 corresponds to a button, and verb s-machine (C) 430 responds to left-mouse-click events by displaying an image. If the screen pointer 350 were moved over screen element (J) 325, the bonds between interface event s-machine 205, verb s-machines (A) and (B) 405, and screen element s-machine (K) 225 would all be broken, to be replaced by bonds between screen element s-machine (J) 225, verb s-machine (C) 430, and interface event s-machine 205 in the same manner as described above. Since verb s-machine (C) 430 responds to left-mouse-click events, it would bind to the very same binding site 445 of interface event s-machine 205 that had previously been bound to verb s-machine (A) 405. Thus, many verb s-machines, all responding to the same event type, can bind, one at a time, to the same binding site on interface event s-machine 205. Further, verb s-machines serve as a means of specializing the response to a generic interface event (such as left-mouse-click) to the context of the screen element s-machine to which it is bound. It should be appreciated that in other embodiments, the functionality of specializing the response to generic interface events may be embedded in the screen element s-machines 225 themselves, rather than separate verb s-machines.

Figure 6:
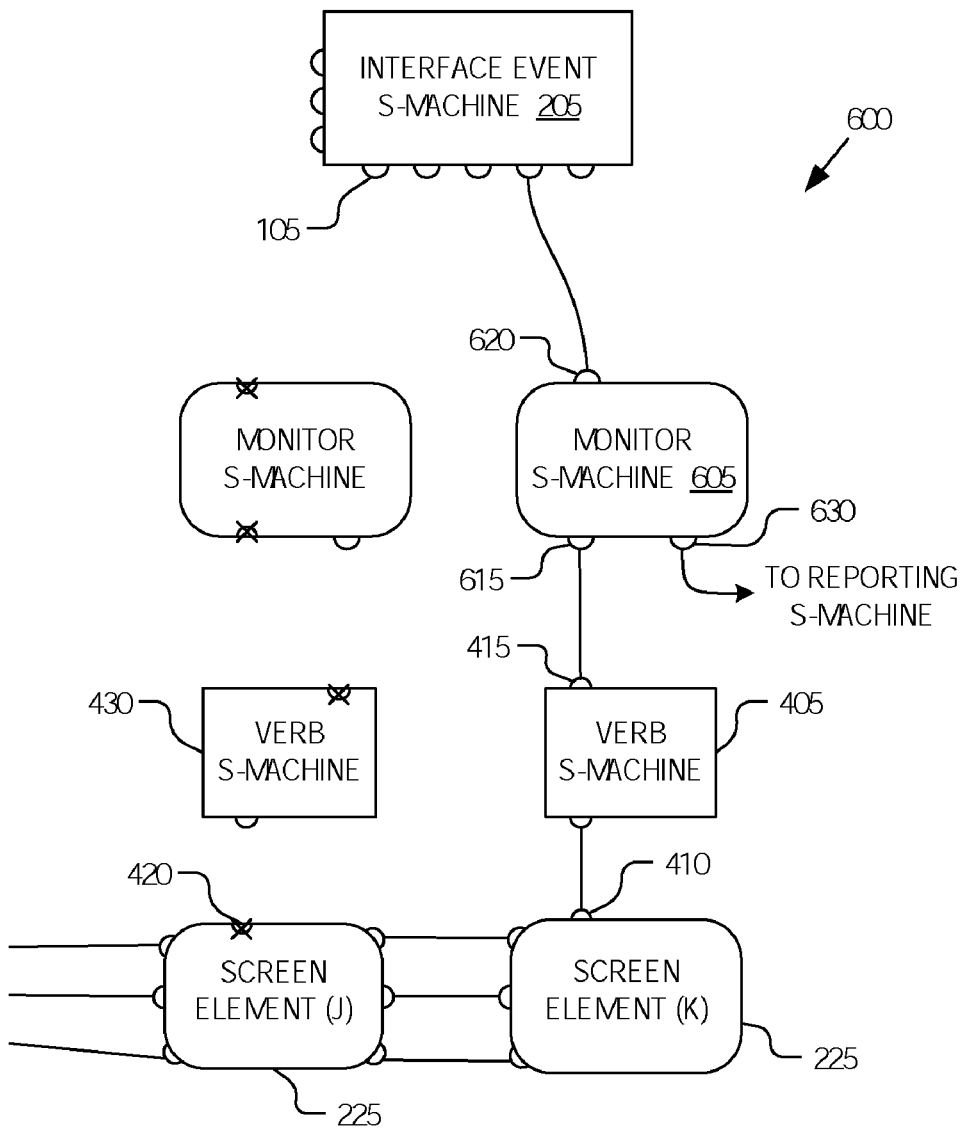
FIG. 6 is a block diagram illustrating self-assembly of a monitoring pathway to monitor for and report on events, in accordance with an embodiment of the invention.

FIG. 6 is a block diagram illustrating self-assembly of a monitoring pathway 600 to monitor for and report on events, in accordance with an embodiment of the invention. Monitoring pathways are established by inserting monitoring s-machines into event pathways. For example, monitoring pathway 600 may be created in response to passing screen pointer 350 over screen element (K) 325 to report on this event and maintain a log of user actions. Again for the sake of discussion, if screen element (K) 325 is an image rendered to display screen 300, then monitor s-machine 605 may report on the signals sent to and/or actions taken by verb s-machine 405, which may then be logged.

Figure 7:
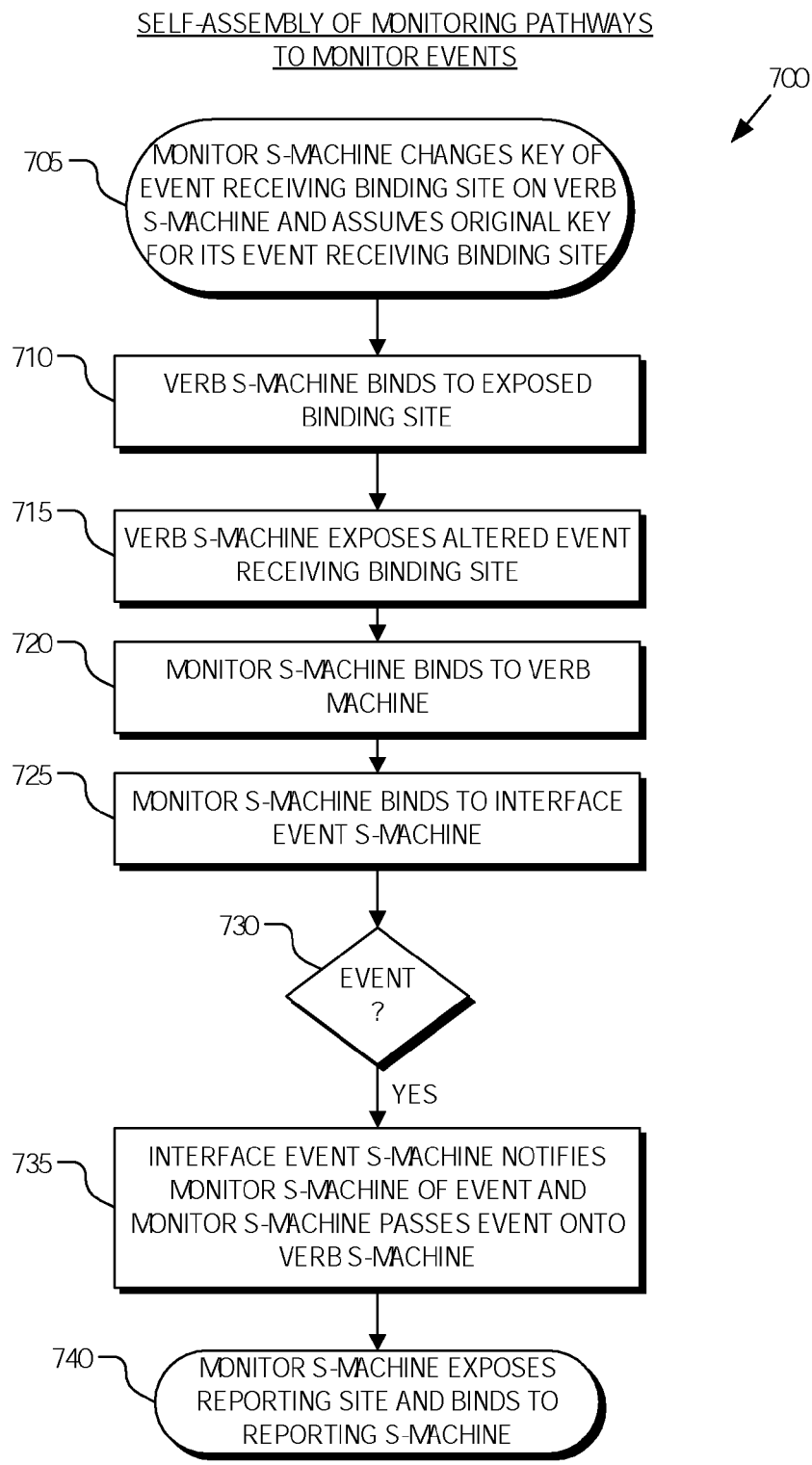
FIG. 7 is a flow chart illustrating a process to self-assemble monitoring pathways to monitor for and report on events, in accordance with an embodiment of the invention.

FIG. 7 is a flow chart illustrating a process 700 to self-assemble monitoring pathway 600 to monitor for and report on events, in accordance with an embodiment of the invention.

In a process block 705, monitor s-machine 605 binds to verb binding s-machine 405 and changes the binding key associated with event receiving binding site 415 to be complementary to the key associated with binding site 615 of the monitor s-machine 605. Monitor s-machine 605 further assumes the original binding key associated with event receiving binding site 415 and associates this original binding key with a currently hidden binding site 620 (not illustrated). Once the binding keys of event receiving binding site 415 and monitor s-machine's binding site 620 are changed, monitoring s-machine 605 may disconnect from verb s-machine 405 until the screen pointer 350 resides over the rendering region corresponding to screen element (K) 325.

In a process block 710, a user moves screen pointer 350 over screen element (K) 325, causing screen element s-machine (K) 225 to expose verb binding site 410 and bind to verb s-machine 405. In process block 715, verb s-machine 405 exposes event receiving binding site 415 having the altered binding key. Since the altered binding key no longer matches the binding key on interface event s-machine 205; but rather, matches a binding site 615 on monitor s-machine 605, verb s-machine 405 binds to monitor s-machine 605 (process block 720). The bonding event between monitor s-machine 605 and verb s-machine 405 causes monitor s-machine 605 to expose a binding site 620 with a binding key that was assumed in process block 705 from verb s-machine 405. The exposed binding site 602 binds to interface event s-machine 205 establishing monitoring pathway 600 (process block 725).

In a decision block 730, if an event associated with screen element (K) 325 occurs, then process 700 continues to a process block 735. In process 735, interface event s-machine 205 notifies monitor s-machine 605 of the event, which in turn notifies verb s-machine 405. Verb s-machine 405 may then take an appropriate action in response to the event. In a process block 740, monitor s-machine 605 exposes a reporting binding site 630, which may bind to a reporting s-machine for maintaining a log of events. It should be appreciated that in other embodiments, the monitor s-machine may be permanently bound to a reporting machine. In this case, rather than exposing a reporting site 630, monitor s-machine 605 would pass a signal to the reporting machine via the already existing bond at reporting site 630. In other embodiments, the functionality of monitoring the event pathway may be embedded in the reporting machine itself.

As illustrated, monitor s-machines insert themselves into event pathways to create monitoring pathways by changing the binding keys of verb s-machines. Once inserted, event processing continues in much the same way as disclosed in connection with process 500, with the exception that monitor s-machines report on events as they occur in real-time. Since verb s-machines implement actions associated with screen elements, event pathways linked directly to verb s-machines are convenient locations for monitoring user interactions with a computing environment. Although FIG. 6 illustrates monitor s-machine 605 as inserting itself into an event pathway between verb s-machine 405 and interface event s-machine 205, it should be appreciated that monitor s-machine 605 may insert itself into other event pathways to monitor the same event. For example, monitor s-machine 605 may insert itself into an event pathway between verb s-machine 405 and screen element (K) s-machine 225. In another embodiment, monitor s-machine 605 may link to interface event s-machine 205, assume its original binding key, and assign this binding key to binding site 615. In this manner, one monitor s-machine 605 could be used to bind to many different verb s-machines and monitor for related events without having to generate one monitor s-machine per verb s-machine.

Figure 8:
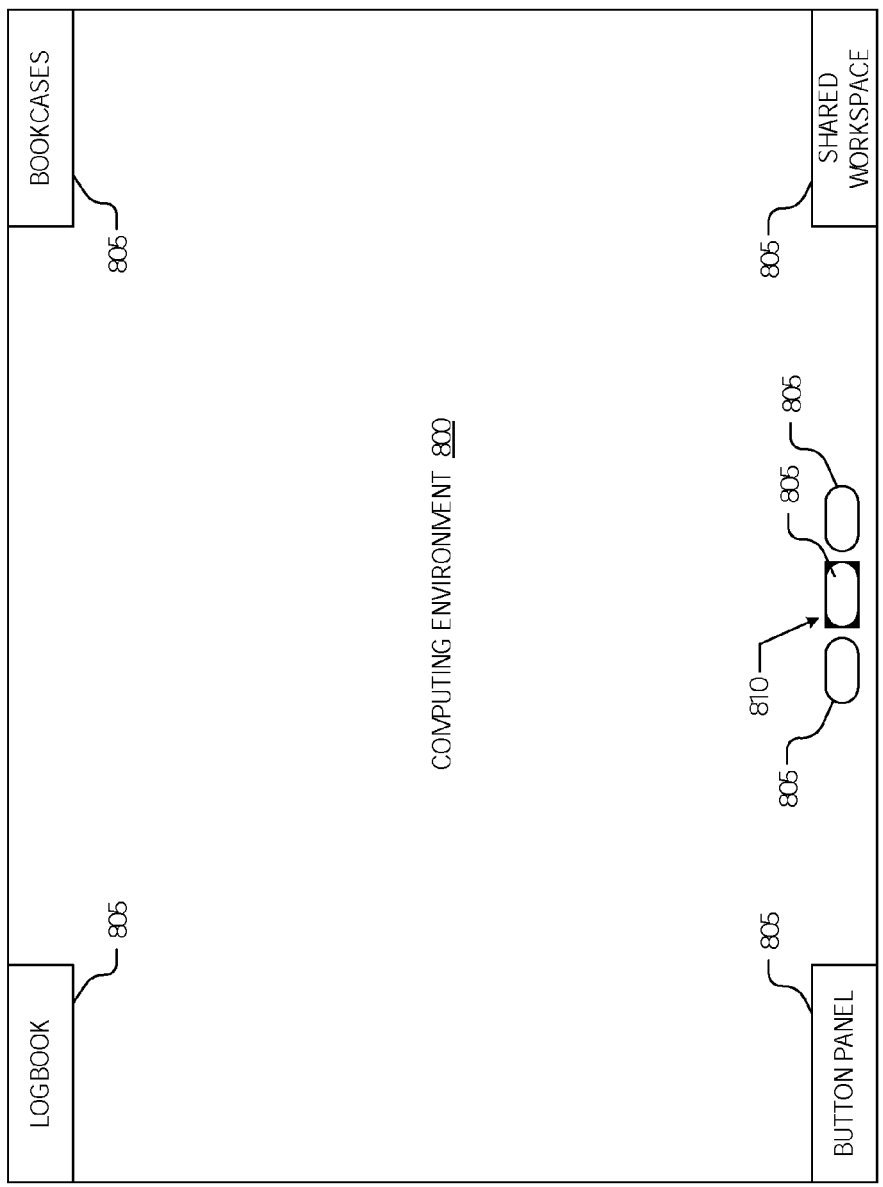
FIG. 8 is a block diagram illustrating a rendered display screen including access elements, in accordance with an embodiment of the invention.

FIG. 8 is a block diagram illustrating a computing environment 800, in accordance with an embodiment of the invention. Access elements 805 are a type of screen element 325 rendered to provide visual access to associated functions. The bookcase access element accesses one or more bookcases having bookshelves holding virtual books for creating, storing, accessing, and modifying data. The logbook access element accesses a logbook enabling a user to view a record or history of past events and even undo selected past events. The button panel access element accesses function-specific buttons (e.g., a calculator). The shared environment access element accesses a shared environment, which enables a variety of users to remotely collaborate. Finally, the screen access elements enable a user to switch between multiple independent virtual desktops. A visual cue as to which virtual desktop is currently displayed may be provided by visual cue 810

In one embodiment, computing environment 800 is rendered using a hierarchical data structure similar to hierarchical data structure 200. Each access element 805 may be associated with a screen element 225. When a user positions a screen pointer over one of the access elements 805, a verb s-machine establishes an event pathway (see process 500). Upon clicking on a particular access element 805, the verb s-machine can take the appropriate action to access the corresponding function, which is subsequently rendered to computing environment 800. A plurality of monitoring s-machines may be available to insert themselves into a variety of event pathways associated with any number of verb s-machines to log events occurring with the computing environment, including when and which access elements 805 are selected.

Figure 9:
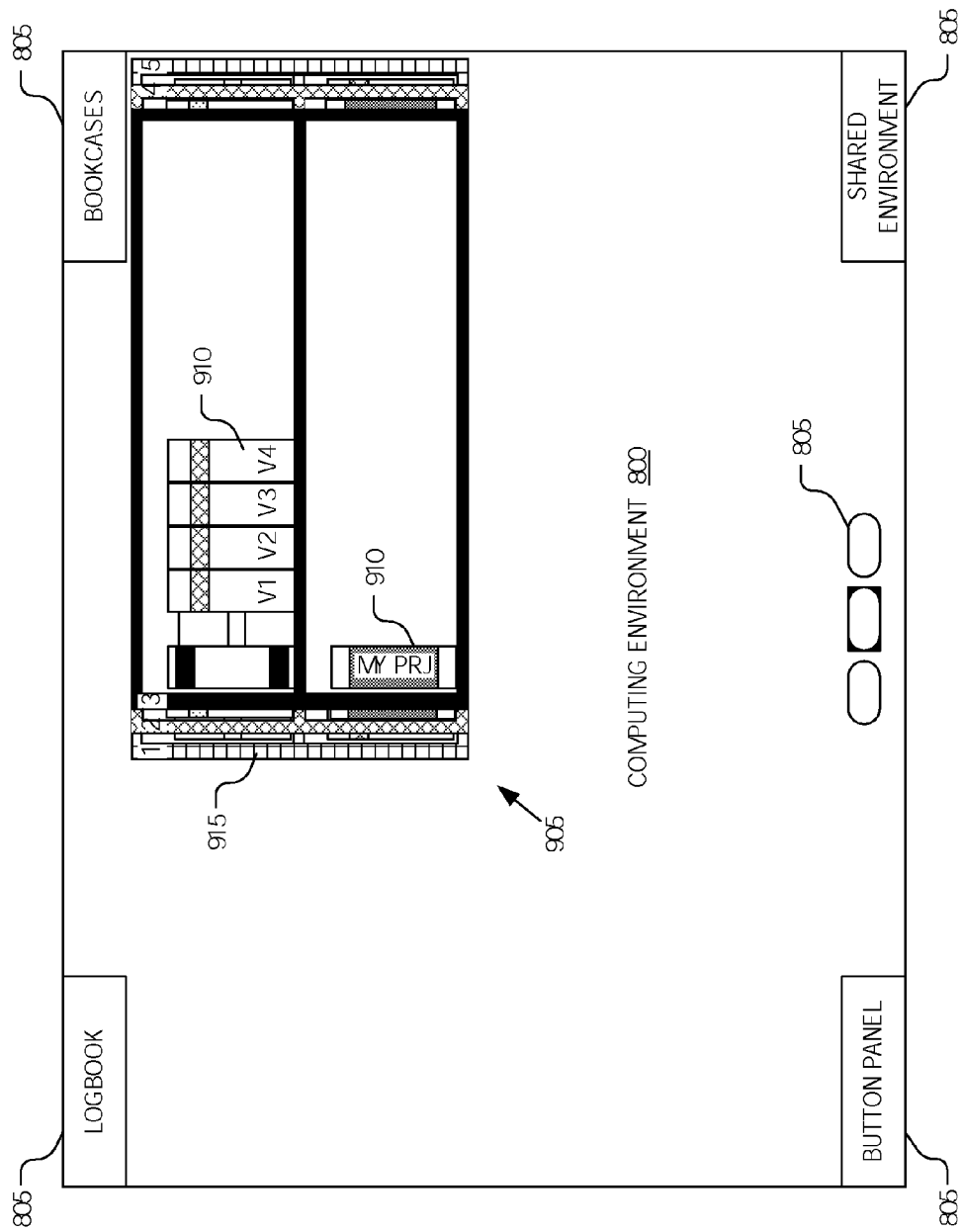
FIG. 9 is a block diagram illustrating a rendered display screen including a bookcase for storing, organizing, and retrieving virtual books, in accordance with an embodiment of the invention.

FIG. 9 is a block diagram illustrating computing environment 800 including a virtual bookcase 905 for storing, organizing, and retrieving virtual books 910, in accordance with an embodiment of the invention. Virtual bookcase 905 intuitively organizes virtual books 910 in a manner easily usable by less tech-savvy individuals who are not comfortable with hierarchical file structures (e.g., Windows Explorer or DOS based directory systems). Data, text, and/or images are accessible by opening one of virtual books 910. Virtual books 910 are stored on bookcases 905 and identified by their physical location within a particular bookcase 905 (i.e., bookshelf and position on bookshelf) and the visual distinctiveness of virtual books 910. Patterns, designs, and/or color schemes may be associated with each virtual book 910 or with groups of virtual books 910 containing related information to aid the user with identifying his/her desired virtual book 910.

In one embodiment, virtual bookcase 905 is accessed by clicking on the bookcase access element. In one embodiment, a user may bring to front (expose) any one of multiple virtual bookcases 905 by clicking on a left tab region 915 of the particular virtual bookcase to be exposed. Again, virtual bookcase 905 and virtual books 910 may be rendered within computing environment 800 using a hierarchical data structure. For example, back rendering layers may be associated with virtual bookcase 905, while front rendering layers may be associated with virtual books 910. A particular virtual book 910 may be opened by clicking on the spine or binding of the particular virtual book 910.

Verb s-machines may establish event pathways as the user moves screen pointer 350 over the book spines. The verb s-machines execute the tasks associated with opening a book upon registering a mouse click. Similarly, monitoring s-machines may establish monitoring pathways as the user moves screen pointer 350 over the virtual book spines and generate a log entry recording each virtual book 910 accessed by the user.

Figure 10:
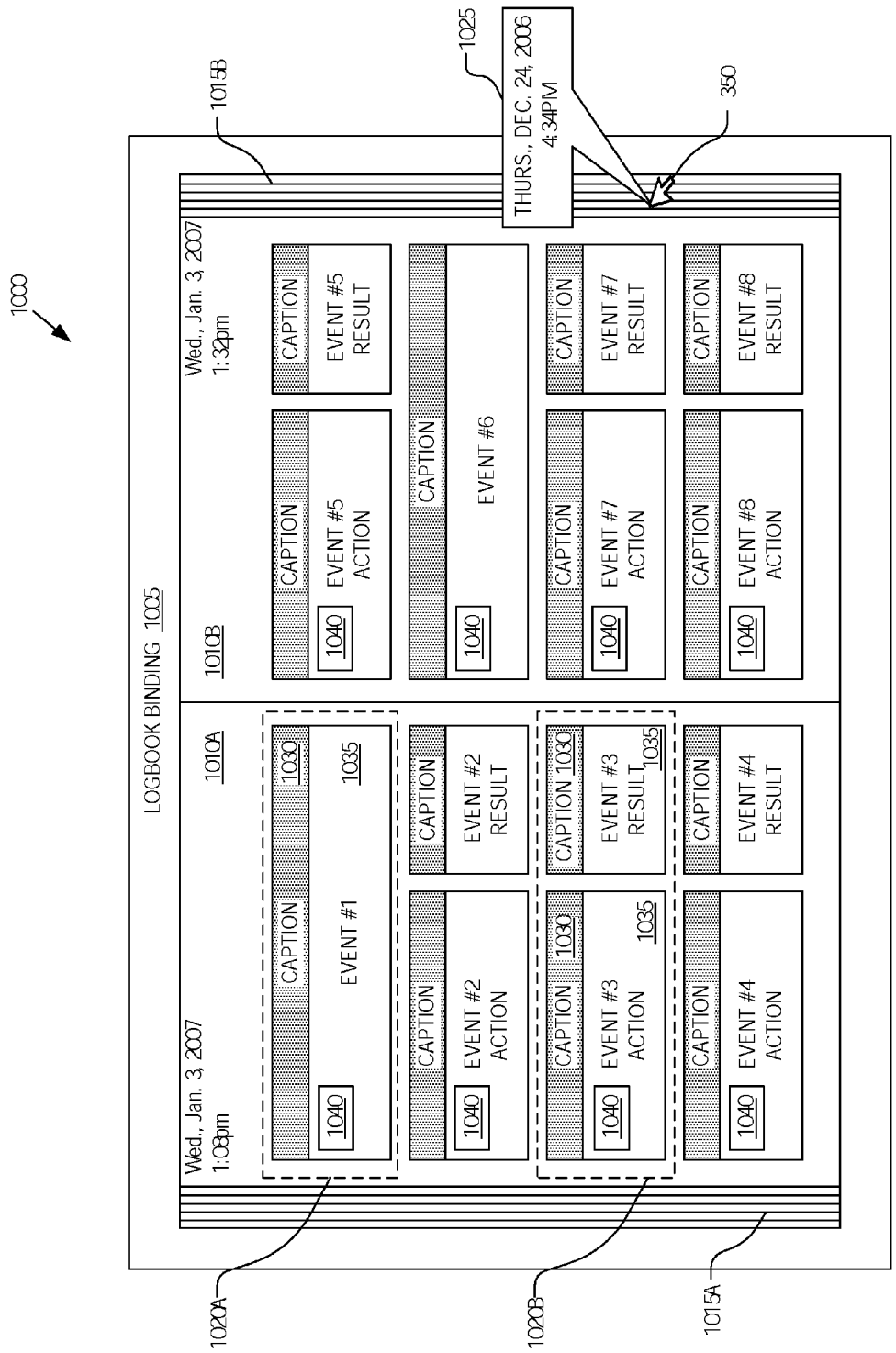
FIG. 10 is a block diagram illustrating a logbook for logging, displaying, searching, or manipulating a history of past events occurring within a computing environment, in accordance with an embodiment of the invention.

FIG. 10 is a block diagram illustrating a logbook 1000 for logging, displaying, searching, or manipulating a history of past events occurring within computing environment 800, in accordance with an embodiment of the invention. Although logbook 1000 is discussed in relation to computing environment 800, it should be appreciated that logbook 1000 may be used to log events in any number of computing environments, such as Microsoft Windows™, Linux™, Mac OS X™, or otherwise.

The illustrated embodiment of logbook 1000 includes a logbook binding 1005, pages 1010 (including pages 1010A and 1010B), page edge regions 1015A and 1015B (collectively 1015). As events transpire within computing environment 800, pages 1010 of logbook 1000 are written with log entries 1020 (including log entries 1020A and 1020B) describing these events to generate a history of past events. Events may occur anywhere within computing environment 800 and even across multiple different applications and documents. The events may transpire in response to user inputs (e.g., mouse click, key stroke, scroll wheel action, cursor navigation action, or otherwise) or other activity (e.g., network event) and are logged in real-time.

In one embodiment, each page of logbook 1000 includes a timestamp in the upper left or right corner to indicate the time and date of the first log entry 1020 on the page. Of course, the timestamp may be positioned in other locations and individual timestamps may even be listed for each log entry 1020.

In one embodiment, each log entry 1020 includes a caption 1030 and an event display region 1035. Captions 1030 textually describe the event associated with the particular log entry 1020, while event display regions 1035 illustrate the associated event. For some event types, the corresponding log entry 1020 (e.g., log entry 1020A) is made up of a single panel, with a single caption 1030 and a single event display region 1035. For other event types, the corresponding log entry 1020 (e.g., log entry 1020B) is separated into two panels, each with its own caption 1030 and event display region 1035. In the example of log entry 1020B, the left event display region 1035 illustrates an action associated with the corresponding event and the right event display region 1035 illustrates a result of the corresponding event resulting from the action illustrated on the left.

As discussed above, events can be categorized into event types based on a variety of factors including location of a cursor on a display screen, the current state of computing environment 800 (e.g., is a book open, what application is currently being accessed, etc.), and whether the user input is a mouse click, a key stroke, a scroll wheel action, a cursor navigation, or otherwise. Some example event types may include a text edit event, a text insertion event, a text deletion event, a book access event, an image edit event, a web browsing event, an email event, an email creation event, or otherwise. In fact, event types may include generic application event types associated with each different application installed on computing environment 800 and specific application event types associated with specific actions a user may accomplish within a given application. Accordingly, an event may be categorized under multiple event types including generic application event types and specific application event types. For example, all events related to a book may be categorized as a generic book event type, while specific events that may occur in relation to a book may also be categorized as a specific book event type, such as an edit event, a text insertion event, a text deletion event, an image edit event, and so on. In one embodiment, some or all event types are assigned a unique icon 1040 representative of the event type. The icons enable a user to quickly scan logbook 1000 to visually find a particular past event.

As log entries 1020 fill up multiple pages of logbook 1000, a user can peruse the history of past events by flipping pages in logbook 1000. The user may flip forward in time through logbook 1000 by mouse clicking on page edge region 1015B, or alternatively, flip backward in time through logbook 1000 by mouse clicking on page edge region 1015A. In one embodiment, as the user positions cursor 350 over one of page edge regions 1015, a popup caption 1025 may appear to indicate the date and time of the first log entry 1020 that will be flipped to should the user "click" the mouse. By positioning mouse 350 further from the left edge of page 1010A within page edge region 1015A, the further back in time a single mouse click will navigate within logbook 1000. Similarly, the further from the right edge of page 1010B within page edge region 1015B, the further forward in time a single mouse click will navigate within logbook 1000. In one embodiment, to flip a single page to the right, a user can click in the right page margin of page 1010B. Similarly, flipping a single page to the left may be achieved by clicking on the left page margin of page 1010A.

Figure 11A:
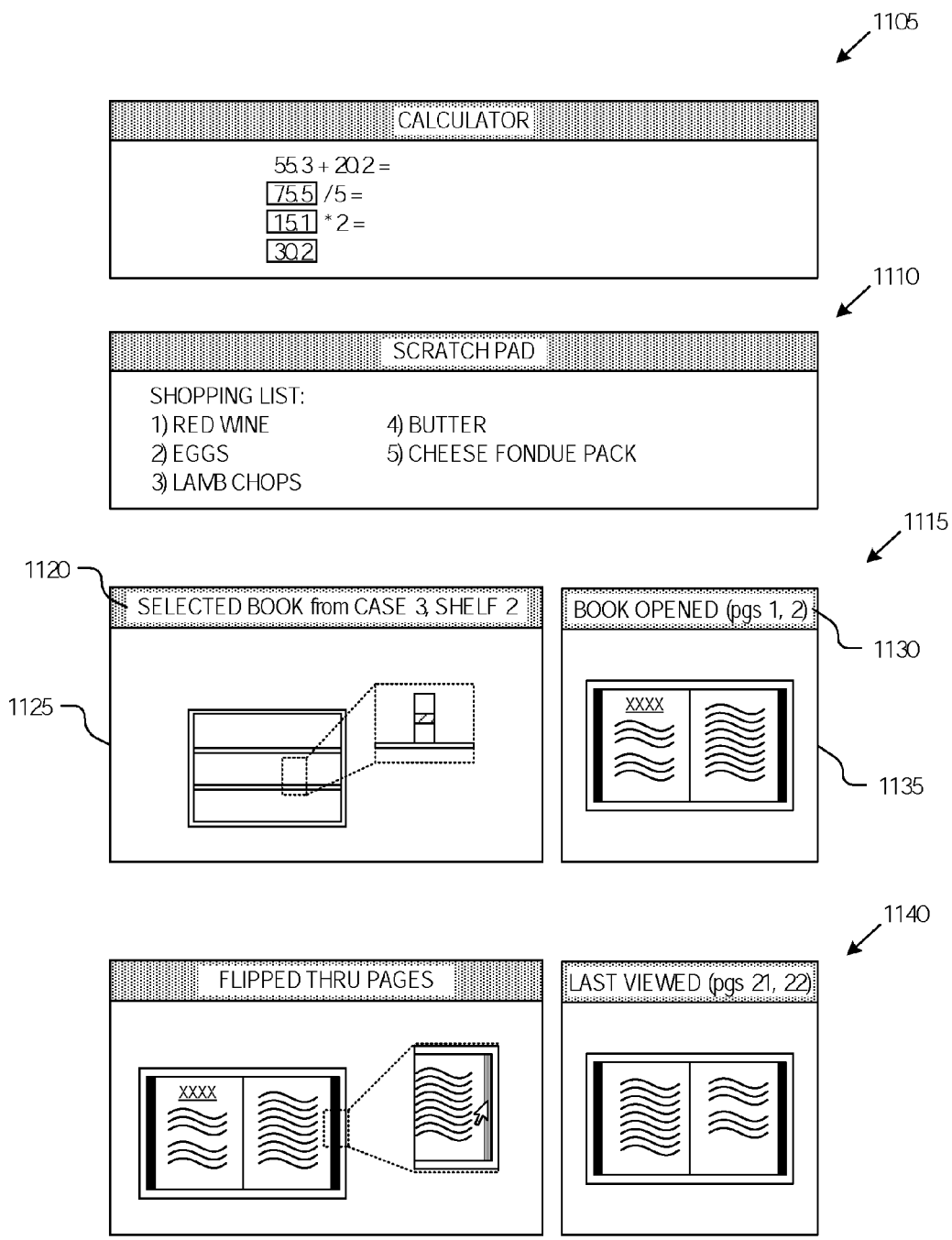
FIG. 11A is a block diagram illustrating demonstrative log entries of a logbook, in accordance with an embodiment of the invention.
Figure 11B:
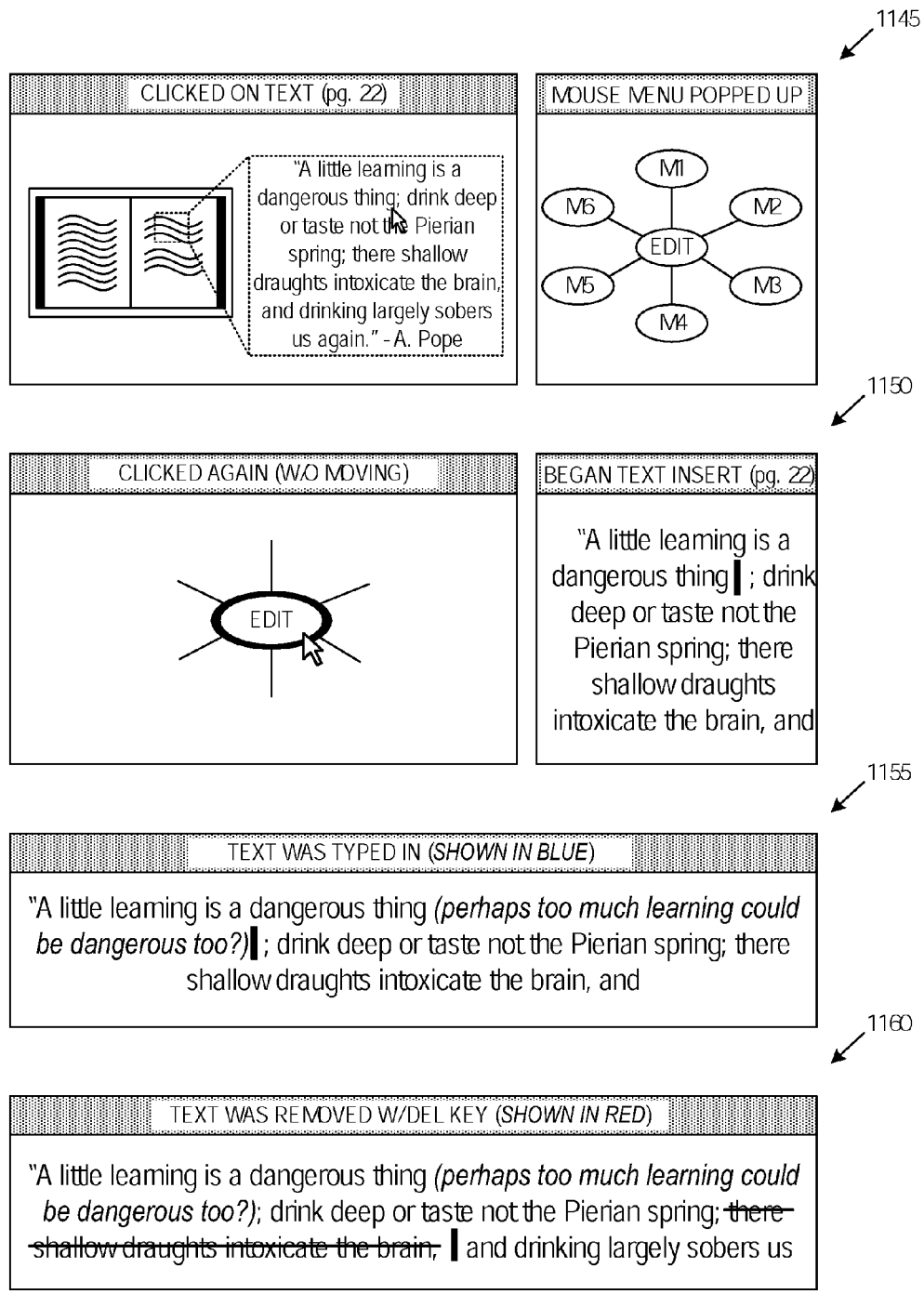
FIG. 11B is a block diagram illustrating demonstrative log entries of a logbook, in accordance with an embodiment of the invention.
Figure 11C:
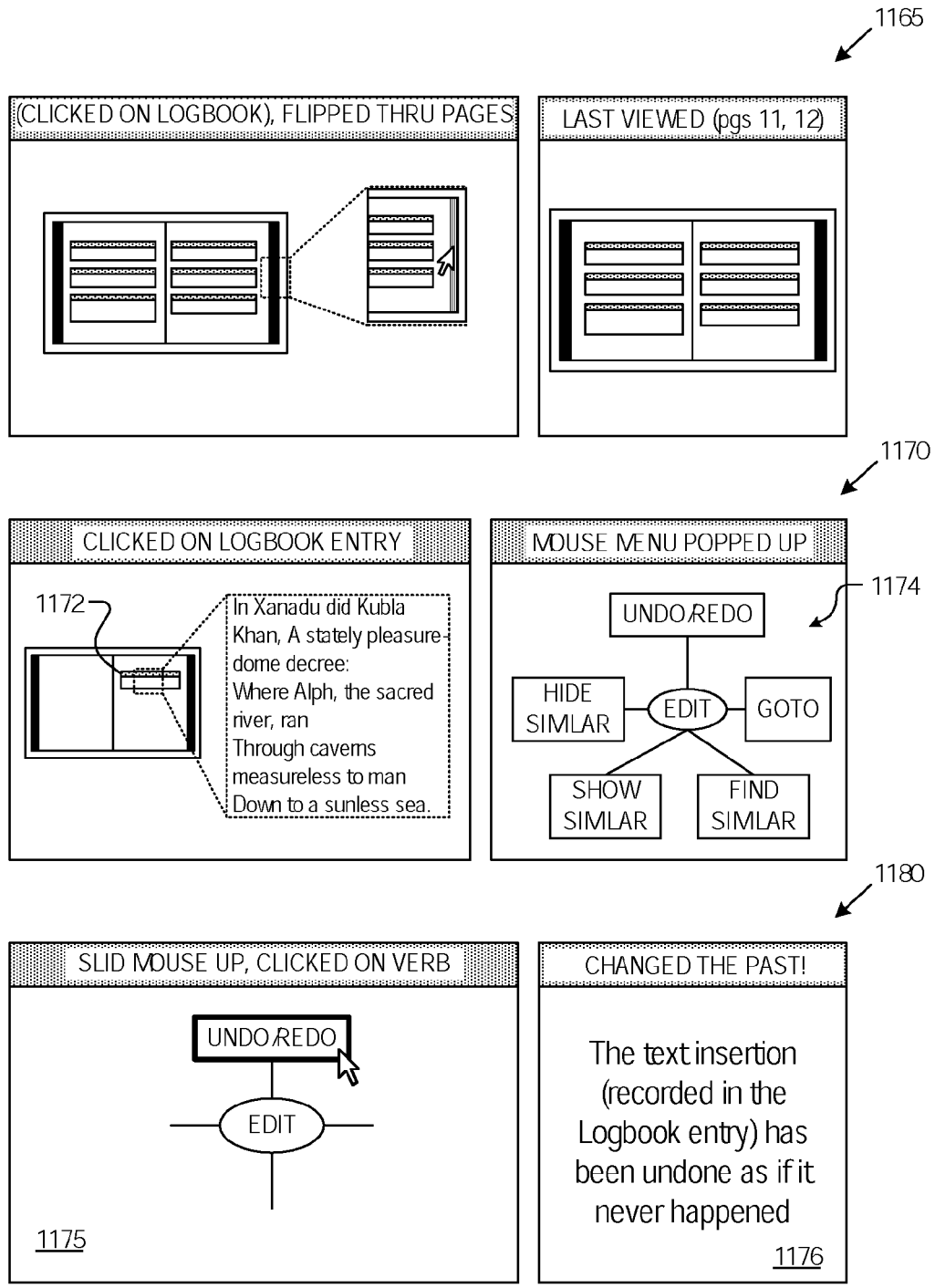
FIG. 11C is a block diagram illustrating demonstrative log entries of a logbook, in accordance with an embodiment of the invention.

FIGS. 11A, 11B, and 11C illustrate example log entries that could be recorded into logbook 1000 during the course of execution of computing environment 800, in accordance with an embodiment of the invention. FIGS. 11A, 11B, and 11C are provided as mere illustrative examples.

FIG. 11A illustrates a log entry 1105 having a caption "CALCULATOR." In one embodiment, if a user commences typing on the numeric pad of a keyboard, computing environment 800 automatically navigates to logbook 1000 and a new log entry (e.g., log entry 1105) is created. As the user inputs numbers and mathematical functions (e.g., +, −, *, /), the numbers, functions, and results are displayed and saved in log entry 1105 for future reference. In other words, the calculations become part of the history of past events that can be subsequently searched and reviewed.

Logbook 1000 may also be used as a scratch pad to write miscellaneous notes, journal entries, reminders, lists, or otherwise. For example, a user of computing environment 800 may navigate to logbook 1000, create an empty log entry 1110, and populate it with text (e.g., shopping list).

Log entry 1115 logs a book selection event and includes two panels. The left panel includes a caption 1120 reciting, "SELECTED BOOK from CASE 3, SHELF 2" and an event display region 1125 illustrating the action of selecting a book from shelf 2 within case 3. The right panel includes a caption 1130 reciting, "BOOK OPENED (pgs. 1, 2)" and an event display region 1135 illustrating the result of selecting the book from shelf 2 within case 3. In other words, upon selecting the book from shelf 2 within case 3, the book was opened to pages 1 and 2, as illustrated. In one embodiment, the images depicted in event display region 1125 and/or event display region 1135 are generic icons representing the associated action or result. In one embodiment, the images depicted in event display region 1125 and/or event display region 1135 are images of the actual book that was selected, the actual book case and shelf from which the book was selected, and the actual pages to which the book was opened, or some combination thereof.

In the embodiment where the images depicted in event display regions 1125 and 1135 are icons (e.g., icons 1040), these icons may be distinctive based on the event type being illustrated, the user that initiated the event, or other factors that may be desirable to graphically represent. In the embodiment where the images depicted in event display regions 1125 and 1135 are actual images, event type icons (e.g., icons 1040) may also be included within one or both of event display regions 1125 and 1135. In yet another embodiment, the background of captions 1120 and 1130 may have distinctive patterns/colors to represent event types.

Log entry 1140 illustrates an event associated with a user flipping through pages of the book selected in log entry 1115. Log entry 1140 includes a left panel captioned "FLIPPED THRU PAGES" and an action illustration of a mouse cursor hovering over page edge region 1015B. Log entry 1140 includes a right panel captioned "LAST VIEWED (pgs. 21, 22)" and a result illustration depicting the last two pages of the book viewed. In one embodiment, log entries may group related events into a single log entry. For example, suppose the user of computing environment 800 flipped through pages 1 to 22 of the book selected in log entry 1115. In this example, logbook 1000 may include the single log entry 1140 for illustrating all page turning events between pages 1 and 22. It should be appreciated that grouping of related events, in some embodiments, may only occur when the related events are temporally contiguous and not split up by a separate distinctive event.

Referring to FIG. 11B, a log entry 1145 illustrates an event associated with a user selection of text within a book. Log entry 1145 includes a left panel captioned "CLICKED ON TEXT (pg. 22)" and an action illustration showing the region of text surrounding the location that the user selected. Log entry 1140 includes a right panel captioned "MOUSE MENU POPPED UP" and a result illustration depicting the popup menu. Log entry 1150 illustrates an event associated with a user selection within the popup menu. Log entry 1150 includes a left panel captioned "CLICKED AGAIN (W/O MOVING)" and an action illustration showing the "EDIT" button selected by the user within the popup menu. Log entry 1150 includes a right panel captioned "BEGAN TEXT INSERT (pg. 22)" and a result illustration depicting a cursor placed within the selected text. Log entries 1155 and 1160 illustrate text insertions and deletions, respectively.

Referring to FIG. 11C, log entries 1165, 1170, and 1175 associated with logbook events are illustrated. In particular, log entry 1165 illustrates that the user accessed logbook 1000 and flipped through its pages ending on pages 11 and 12. Log entry 1165 illustrates that the user was visually scanning through logbook 1000 searching for a particular past event. Instead of identifying pages of logbook 1000 by page numbers, dates and times may be used in the caption of the right panel of log entry 1165.

Even as a user is accessing logbook 1000, new log entries recording these user events are being generated. Log entry 1170 illustrates the selection of a particular log entry 1172 within logbook 1000 by the user. For example, log entry 1172 may be a log entry that recorded a previous text insertion, similar to log entry 1155. The result of the user selection is a popup menu 1174 providing the user with a number of menu options. As recorded in event display region 1175 of log entry 1180, the user selected the undo/redo menu option, resulting in the text insertion being undone and the inserted text removed (illustrated in event display region 1176).

It is noted that log entries 1165, 1170, and 1180 record user actions that actually occurred while the user was viewing pages 11 and 12 of logbook 1000. In other words, log entries 1165, 1170, and 1180 were generated in real-time on the last page of logbook 1000, while the user was accessing intermediate pages 11 and 12. In one embodiment, upon undoing an event recorded by a log entry (e.g., log entry 1172), the original log entry is shaded or grayed to indicate the event has been undone. Clicking the shaded or grayed out log entry and selecting the "redo" menu option would restore the original action of the log entry.

As illustrated by log entry 1170, in one embodiment, selecting a log entry (e.g., log entry 1172) will cause a popup menu 1174 to appear. Popup menu 1174 provides the user with a number of function options including edit, undo/redo, hide similar, show similar, find similar, and goto. The "edit" option enables the user to edit certain log entries. For example, if the log entry is a scratch pad entry (e.g., log entry 1110) or a calculator entry (e.g., log entry 1105), then the user can edit the log entry to update the shopping list or continue with the calculations. However, it should be appreciated that some log entries are read-only entries that may be undone or redone, but not edited (e.g., log entries 1155 or 1160).

The "hide similar" option enables the user to visually hide log entries tagged with a similar event type categorization. The "show similar" option is the opposite of the "hide similar" function, showing only log entries of events having the same event type categorization, while hiding all other log entries. The "hide similar" and "show similar" functions aid the user by collapsing logbook 1000 to display a subset of the log entries. The user can then visually or manually scan through the collapsed logbook 1000 to find a particular past event. These visual/manual searches can also be referred to as graphical searches since the user is searching for a particular past event by event types, which are graphically depicted with icons 1040.

The "goto" option is a hyperlink that, if selected, will navigate the user to the original location within computer environment 800 where the event occurred. For example, if the user were to select the "goto" option in relation to log entry 1155, then the user would be navigated to the book, page, and paragraph in which the text insertion was originally typed. The "goto" option will automatically load applications and open particular files or documents to navigate the user to the virtual scene of the event. It should be appreciated that icons 1040, captions 1030, or event display regions 1035 may be hyperlinked to provide quick, direct access to the source of the event.

The "find similar" option is a function for performing a more tailored search of logbook 1000 to find a particular past event. The "find similar" option searches events having a similar event type as the selected log entry, but then prompts the user to input date and time restrictions, as well as other possible search criteria. The "find similar" may be thought of as an algorithmic search function that allows the user to input search criteria. In one embodiment, the algorithmic search may be selected as a menu option within logbook 1000, not in relation to any particular log entry. In this algorithmic search, the user can again select search criteria as described above including multiple event type designations.

It should be appreciated that FIGS. 10, 11A, 11B, and 11C illustrate just one possible format for displaying a history of past events. Other formats for displaying the above described functionality of logbook 1000 may be implemented. For example, logbook 1000 may be formatted as a list or table in place of the images illustrated in FIGS. 11A, 11B, and 11C.

Furthermore, logbook 1000 could be displayed within a document, spreadsheet, or other application, as opposed to a book.

Logbook 1000 may be rendered with a hierarchical data structure similar to hierarchical data structure 200. The individual screen elements of logbook 1000 may support interactive functionality for viewing, hiding, sorting, and searching log entries 1020, as well as support functionality for manipulating the past events recorded in logbook 1000 (e.g., undoing and redoing the event associated with a particular log entry 1020).

Figure 12:
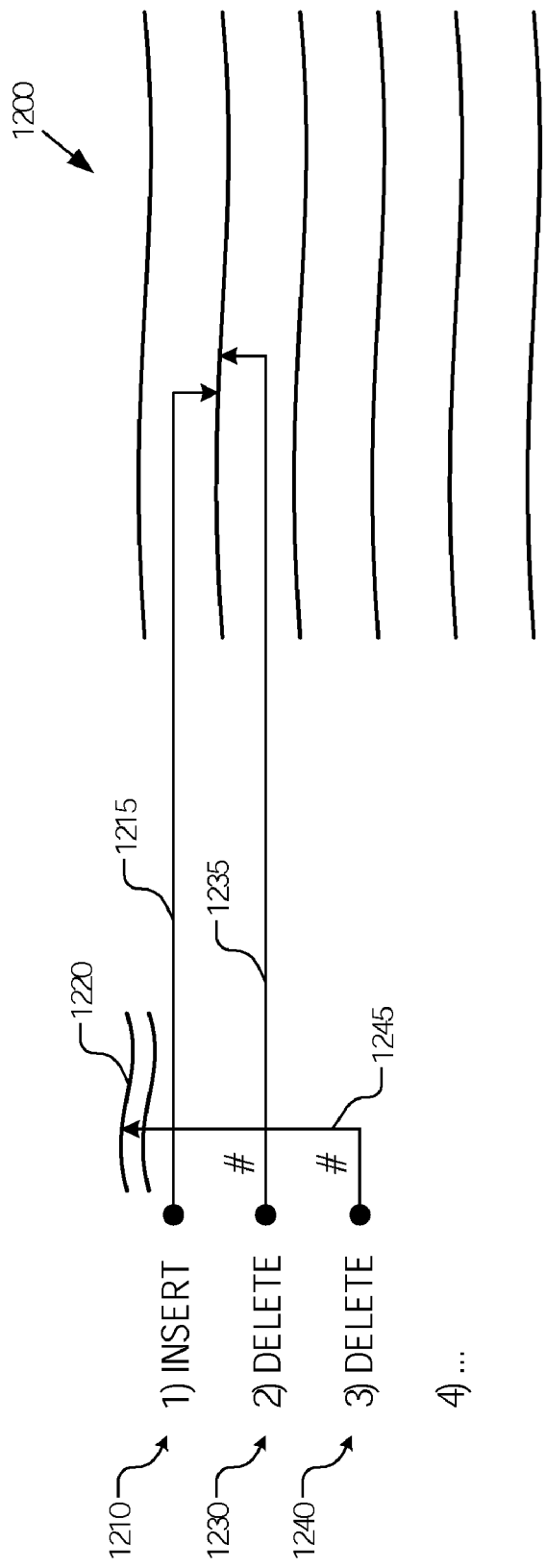
FIG. 12 is a diagram illustrating an undo feature of a logbook, in accordance with an embodiment of the invention.

FIG. 12 is a diagram illustrating the undo feature of logbook 1000, in accordance with an embodiment of the invention. In one embodiment, the undo feature for text is implemented using a combination of a text snapshot 1200 and insertion and deletion vectors. Text snapshot 1200 represents a body of saved text, while the insertion and deletion vectors represent changes to the saved text.

For example, an insertion vector 1210 includes an insertion pointer 1215 and inserted text 1220. The insertion pointer 1215 references the location within snapshot 1200 where text was added and inserted text 1220 is the text that was inserted at the location referenced by insertion pointer 1215. Insertion vector 1210 includes all the information needed to modify snapshot 1200 with inserted text 1220. Accordingly, selecting the undo feature on inserted text 1220 simply entails removing insertion vector 1210, which will cause snapshot 1200 to revert to a state unmodified by insertion vector 1210.

The illustrated embodiment of a deletion vector 1230 includes a deletion pointer 1235 and a number of contiguous characters that were deleted. The deletion pointer 1235 may point either to the first character location deleted or the last character location deleted. Alternatively, deletion vector 1230 may include two deletion pointers, one referencing the location of the first character of a series of contiguous characters deleted, and one referencing the location of the last character of the series of contiguous characters deleted. Deletion vector 1230 includes all the information needed to modify snapshot 1200 to delete the identified character therefrom. Accordingly, selecting the undo feature on deleted text simply entails removing deletion vector 1230, which will cause snapshot 1200 to revert to a state unmodified by deletion vector 1230.

Deletion vector 1240 represents a deletion of a portion of inserted text 1220. Accordingly, deletion vector 1240 includes a deletion pointer 1245 that references a location within inserted text 1220. Since deletion vector 1240 is dependent upon insertion vector 1210, undoing the insertion of inserted text 1220 would cause deletion vector 1240 to be removed as well. Selecting the undo feature on text deleted by deletion vector 1240 simply entails removing deletion vector 1240, which will cause snapshot 1200 to revert to a state unmodified by deletion vector 1240.

Once the list of change vectors (i.e., insertion and deletion vectors) reaches a specified length, a second snapshot of the text may be saved incorporating all the change vectors intermediate of the original and subsequent snapshot. Implementing the undo/redo feature of logbook 1000 using the insertion and deletion vectors illustrated in FIG. 12, enables logbook 1000 to undo selected past events without undoing subsequent events occurring temporally after the selected past events. Although FIG. 12 illustrates change vectors as they related to textual edits, it should be appreciated that the change vector framework may be extended to other data types including images or otherwise.

Figure 13:
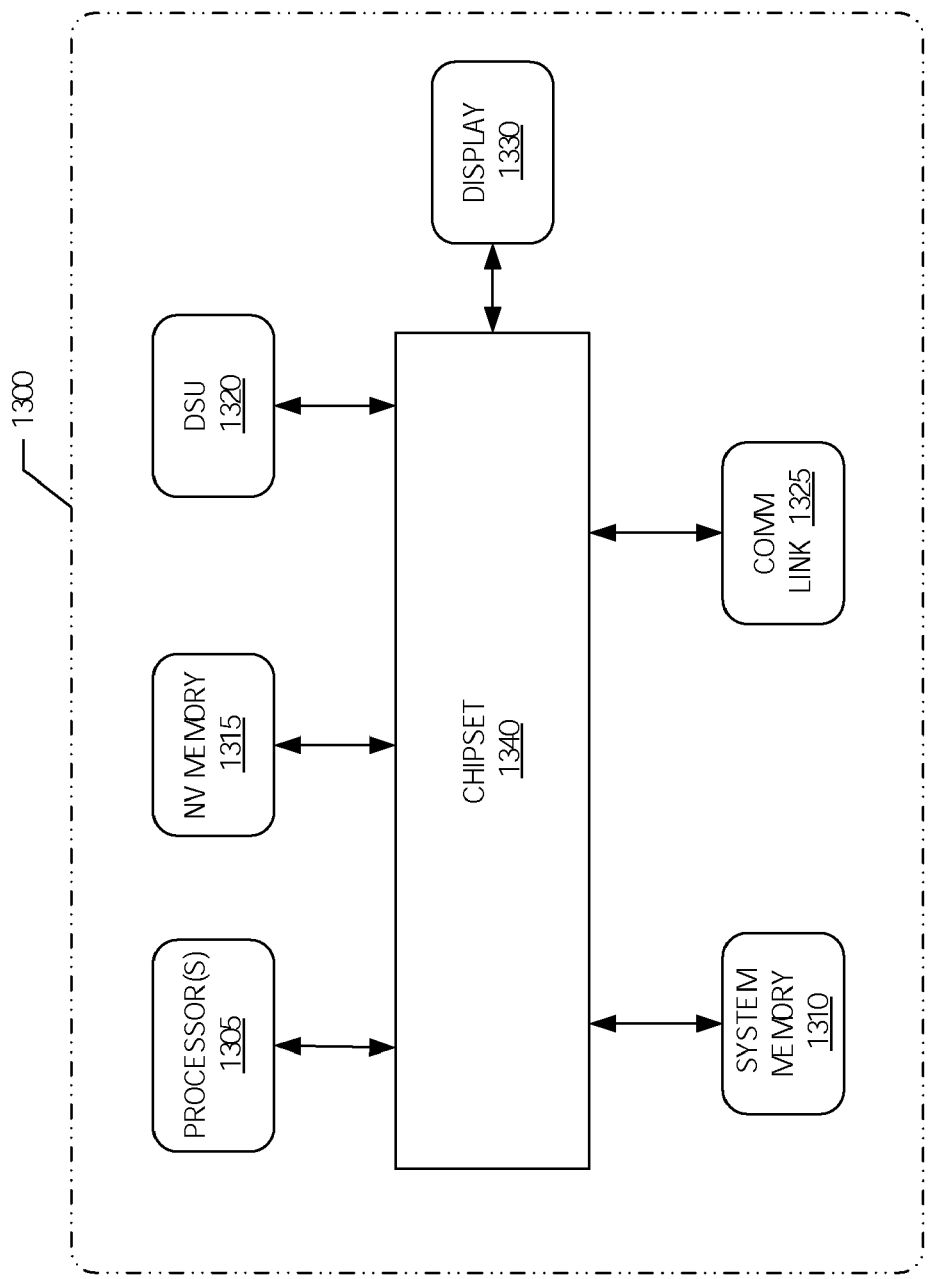
FIG. 13 is a block diagram illustrating a demonstrative processing system to execute embodiments of the invention thereon.

FIG. 13 is a block diagram illustrating a demonstrative processing system 1300 for executing embodiments of the invention described above. The illustrated embodiment of processing system 1300 includes one or more processors (or central processing units) 1305, system memory 1310, non-volatile ("NV") memory 1315, a data storage unit ("DSU") 1320, a communication link 1325, a display 1330, and a chipset 1340. The illustrated processing system 1300 may represent any computing system including a desktop computer, a notebook computer, a workstation, a handheld computer, a server, a blade, or the like.

The elements of processing system 1300 are interconnected as follows. Processor(s) 1305 is communicatively coupled to system memory 1310, NV memory 1315, DSU 1320, and communication link 1325, via chipset 1340 to send and to receive instructions or data thereto/therefrom. In one embodiment, NV memory 1315 is a flash memory device. In other embodiments, NV memory 1315 includes any one of read only memory ("ROM"), programmable ROM, erasable programmable ROM, electrically erasable programmable ROM, or the like. In one embodiment, system memory 1410 includes random access memory ("RAM"), such as dynamic RAM ("DRAM"), synchronous DRAM ("SDRAM"), double data rate SDRAM ("DDR SDRAM"), static RAM ("SRAM"), or the like. DSU 1320 represents any storage device for software data, applications, and/or operating systems, but will most typically be a nonvolatile storage device. DSU 1320 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1320 is illustrated as internal to processing system 1300, DSU 1320 may be externally coupled to processing system 1300. Communication link 925 may couple processing system 1300 to a network such that processing system 900 may communicate over the network with one or more other computers. Communication link 1325 may include a modem, an Ethernet card, a Gigabit Ethernet card, Universal Serial Bus ("USB") port, a wireless network interface card, a fiber optic interface, or the like. Display unit 1330 may be coupled to chipset 1340 via a graphics card and renders images for viewing by a user.

It should be appreciated that various other elements of processing system 1300 may have been excluded from FIG. 13 and this discussion for the purposes of clarity. Chipset 1340 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1340. Correspondingly, processing system 1300 may operate without one or more of the elements illustrated. For example, processing system 1300 need not include DSU 1320.

The processes explained above are described in terms of computer software and hardware. The techniques described may constitute computer-executable instructions embodied within a computer readable medium, that when executed by a computer will cause the computer to perform the operations described. Additionally, the processes may be embodied within hardware, such as an application specific integrated circuit ("ASIC") or the like.

A computer-accessible medium includes any mechanism that provides (i.e., stores and/or transmits) information in a form accessible by a physical machine (e.g., a computer, network device, personal digital assistant, manufacturing tool, any device with a set of one or more processors, etc.). For example, a computer-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
    logging, in real-time, events occurring within multiple different applications executing within a computing environment;
    displaying the events logged from the multiple different applications as a chronologically interleaved history of past events within a logbook of the computing environment, wherein the logbook includes a log entry associated with each of the past events, the log entry comprising:
        a caption textually describing an associated one or more of the events;
        an event display region graphically illustrating the associated one or more of the events; and
        a link selectable by a user;
    providing search functionality via the logbook to search through the history of past events to find one or more selected past events;
    enabling an undo of the one or more selected past events; and
    loading, in response to the user selecting the link within the log entry, an application in which the associated one of the events occurred and navigating the computing environment to a location within the application where the associated one of the events occurred, wherein logging the events includes logging logbook events generated by the user while interacting with the logbook, and wherein displaying the events includes displaying the logbook events.

2. The method of claim 1, wherein each of the events comprises:
    registering at least one of a mouse click, a key stroke, a scroll wheel action, a network event, or a cursor navigation action within the computing environment;
    executing code in response to the at least one of the mouse click, the key stroke, the scroll wheel action, or the cursor navigation action; and
    generating a result in response to executing the code.

3. The method of claim 1, wherein enabling the undo of the one or more selected past events comprises enabling the user of the computing environment to undo the one or more selected past events without undoing one or more subsequent events occurring temporally after the one or more selected past events.

4. The method of claim 3, wherein the one or more selected past events comprise text edits and wherein enabling the undo of the one or more selected past events further comprises:
    saving a snapshot of a document;
    saving insertion pointers referencing locations within the snapshot where text was added to the snapshot; and
    saving deletion pointers referencing locations within the snapshot where text was removed from the snapshot.

5. The method of claim 4, wherein if text that was added to the snapshot was subsequently deleted from the snapshot, then one of the deletion pointers references one of the insertion pointers.

6. The method of claim 1, wherein enabling the undo of the one or more selected past events comprises:
    enabling the user of the computing environment to restore the computing environment to a previous state at a specified time, wherein the one or more selected past events comprise all events occurring after the specified time.

7. The method of claim 1, wherein the event display region comprises:
    a first panel graphically illustrating an action of the associated one or more of the events; and
    a second panel graphically illustrating a result of the associated one or more of the events.

8. The method of claim 1, wherein displaying the events as the history of past events within the logbook further comprises:
    displaying the logbook as an open book with pages;
    displaying the history of past events on the pages; and
    displaying page edge regions to enable page flipping through the logbook.

9. The method of claim 8, wherein displaying the events as the history of past events within the logbook further comprises:
    time stamping each of the pages of the logbook; and
    displaying a timestamp associated with each of the pages of the logbook in response to dragging a cursor over the page edges regions of the logbook.

10. The method of claim 1, wherein displaying the events as the history of past events within the logbook further comprises:
    grouping related events; and
    displaying the related events as a single log entry within the logbook.

11. The method of claim 1, wherein displaying the events as the history of past events within the logbook comprises:
    tagging one or more of the log entries with one or more icons, each of the icons associated with a type of event.

12. The method of claim 11, wherein providing the search functionality via the logbook to search through the history of past events to find the one or more selected past events comprises allowing the user to search for past events having identical icons.

13. The method of claim 11, further comprising:
    enabling the user to select one or more of the icons; and
    hiding log entries tagged with the selected one or more of the icons or hiding log entries not tagged with the selected one or more of the icons.

14. The method of claim 1, wherein providing the search functionality via the logbook to search through the history of past events to find the one or more selected past events comprises:
    enabling an algorithmic search of the logbook to find the one or more selected past events using search criteria including a date, a time, or an event type.

15. The method of claim 1, wherein the computing environment comprises software entities that self-organize during execution and wherein logging events occurring within the computing environment comprises:
    forming event pathways between the software entities in response to user inputs;
    inserting monitors in the event pathways to monitor for the events; and reporting execution of the events to the logbook in real-time.

16. The method of claim 15, wherein the software entities self-assemble during execution by linking binding sites having key values that correspond, and wherein inserting the monitors into the event pathways comprises:
    linking the monitors to the binding sites;
    modifying the key values of the software entities to correspond to other key values of the monitors; and
    forming the event pathways including the monitors in response to the user inputs.

17. The method of claim 16, wherein forming the event pathways including the monitors in response to the user inputs comprises exposing the binding sites of one or more of the software entities in response to the user inputs.

18. A machine-readable storage medium that provides instructions that, if executed by a machine, will cause the machine to perform operations comprising:
    logging events occurring within multiple different applications executing within a computing environment;
    displaying the events logged from the multiple different applications as a history of past events within a logbook of the computing environment, wherein the logbook includes a log entry associated with each of the past events, the log entry comprising:
        a caption textually describing an associated one or more of the events;
        an event display region graphically illustrating the associated one or more of the events; and
        a link selectable by a user;
    providing search functionality via the logbook to search through the history of past events to find one or more selected past events;
    enabling an undo of the one or more selected past events; and
    loading, in response to the user selecting the link within the log entry, an application in which the associated one of the events occurred and navigating the computing environment to a location within the application where the associated one of the events occurred, wherein logging the events includes logging logbook events generated by the user while interacting with the logbook, and wherein displaying the events includes displaying the logbook events.

19. The machine-readable storage medium of claim 18, wherein enabling the undo of the one or more selected past events comprises:
    enabling the user of the computing environment to undo the one or more selected past events without undoing one or more subsequent events occurring temporally after the one or more selected past events.

20. The machine-readable storage medium of claim 19, wherein the one or more selected past events comprise text edits and wherein enabling the undo of the one or more selected past events further comprises:
    saving a snapshot of a document;
    saving insertion pointers referencing locations within the snapshot where text was added to the snapshot; and
    saving deletion pointers referencing locations within the snapshot where text was removed from the snapshot.

21. The machine-readable storage medium of claim 18, wherein the event display region comprises:
    a first panel graphically illustrating an action of the associated one or more of the events; and
    a second panel graphically illustrating a result of the associated one or more of the events.

22. The machine-readable storage medium of claim 18, wherein displaying the events as the history of past events within the logbook further comprises:
    displaying the logbook as an open book with pages; and
    displaying the history of past events on the pages.

23. The machine-readable storage medium of claim 18, wherein displaying the events as the history of past events within the logbook further comprises:
    grouping related events; and
    displaying the related events as a single log entry within the logbook.

24. The machine-readable storage medium of claim 18, wherein displaying the events as the history of past events within the logbook comprises:
    tagging one or more of the log entries with one or more icons, each of the icons associated with a type of event.

25. The machine-readable storage medium of claim 24, wherein providing the search functionality via the logbook to search through the history of past events to find the one or more selected past events comprises allowing the user to search for past events having identical icons.

26. The machine-readable storage medium of claim 24, further providing instructions that, if executed by the machine, will cause the machine to perform further operations, comprising:
    enabling the user to select one or more of the icons; and
    hiding log entries tagged with the selected one or more of the icons or hiding log entries not tagged with the selected one or more of the icons.

27. The machine-readable storage medium of claim 18, wherein providing the search functionality via the logbook to search through the history of past events to find the one or more selected past events comprises enabling an algorithmic search of the logbook to find the one or more selected past events using search criteria including a date, a time, or an event type.

28. The machine-readable storage medium of claim 18, wherein the computing environment comprises software entities that self-organize during execution and wherein logging events occurring within the computing environment comprises:
    forming event pathways between the software entities in response to user inputs;
    inserting monitors into the event pathways to monitor for the events; and
    reporting execution of the events to the logbook in real-time.

29. The machine-readable storage medium of claim 28, wherein the software entities self-assemble during execution by linking binding sites having key values that correspond, and wherein inserting the monitors into the event pathways comprises:
    linking the monitors to the binding sites;
    modifying the key values of the software entities to correspond to other key values of the monitors; and
    forming the event pathways including the monitors in response to the user inputs.

30. The machine-readable storage medium of claim 29, wherein forming the event pathways including the monitors in response to the user inputs comprises exposing the binding sites of one or more of the software entities in response to the user inputs to execute the events.

31. A system, comprising:
a processor to execute instructions; and
a data storage unit coupled to the processor, the data storage unit storing the instructions that, when executed by the processor, will cause the processor to perform operations comprising:
  logging in real-time events occurring within multiple different applications executing within a computing environment;
  displaying the events occurring within the multiple different applications as a chronologically interleaved history of past events within a logbook of the computing environment, wherein the logbook includes a log entry associated with each of the past events, the log entry comprising:
    a caption textually describing an associated one or more of the events;
    an event display region having a first panel graphically illustrating an action of the associated one or more of the events and a second panel graphically illustrating a result of the associated one or more of the events; and
    a link selectable by a user of the computing environment;
  providing search functionality via the logbook to search through the history of past events to find one or more selected past events; and
  enabling the user of the computing environment to undo the one or more selected past events without undoing one or more subsequent events occurring temporally after the one or more selected past events; and
  loading, in response to the user selecting the link within the log entry, an application in which the associated one of the events occurred and navigating the computing environment to a location within the application where the associated one of the events occurred, wherein logging the events includes logging logbook events generated by the user while interacting with the logbook, and wherein displaying the events includes displaying the logbook events.

32. The system of claim 31, wherein displaying the events occurring within the multiple different applications as the history of past events within the logbook comprises:
  displaying the logbook as an open book with pages.

33. The system of claim 31, wherein displaying the events occurring within the multiple different applications as the history of past events within the logbook comprises:
  tagging one or more of the log entries with one or more icons, each of the icons associated with an event type.

34. The system of claim 33, wherein providing the search functionality via the logbook enables the user to search for past events having identical icons.

35. The system of claim 31, wherein the computing environment comprises software entities that self-organize during execution and wherein logging events occurring within the computing environment comprises:
  forming event pathways between the software entities in response to user inputs;
  inserting monitors into the event pathways to monitor for the events; and
  reporting execution of the events to the logbook in real-time.

36. The system of claim 35, wherein the software entities self-assemble during execution by linking binding sites having key values that correspond, and wherein inserting the monitors into the event pathways comprises:
  linking the monitors to the binding sites;
  modifying the key values of the software entities to correspond to other key values of the monitors; and
  forming the event pathways including the monitors in response to the user inputs.

37. The machine-readable storage medium of claim 18, wherein the caption textually describing the associated one or more of the events comprises a distinctive background pattern and color that represents a specific type of event.

* * * * *